US012097158B2

(12) United States Patent
Choi et al.

(10) Patent No.: US 12,097,158 B2
(45) Date of Patent: Sep. 24, 2024

(54) REHABILITATION EXERCISE DEVICE FOR UPPER AND LOWER LIMBS

(71) Applicant: H ROBOTICS INC., Pohang-si (KR)

(72) Inventors: Byeong-Geol Choi, Seoul (KR); Ho-Moon Kim, Suwon-si (KR); Chang-Hwa Jung, Bucheon-si (KR)

(73) Assignee: H ROBOTICS INC., Pohang-si (KR)

( * ) Notice: Subject to any disclaimer, the term of this patent is extended or adjusted under 35 U.S.C. 154(b) by 564 days.

(21) Appl. No.: 17/059,407

(22) PCT Filed: Nov. 2, 2020

(86) PCT No.: PCT/KR2020/015125
§ 371 (c)(1),
(2) Date: Nov. 27, 2020

(87) PCT Pub. No.: WO2021/096131
PCT Pub. Date: May 20, 2021

(65) Prior Publication Data

US 2022/0133576 A1 May 5, 2022

(30) Foreign Application Priority Data

Nov. 15, 2019 (KR) ........................ 10-2019-0146775
Feb. 25, 2020 (KR) ........................ 10-2020-0022970
(Continued)

(51) Int. Cl.
*A61H 1/02* (2006.01)

(52) U.S. Cl.
CPC ............... *A61H 1/02* (2013.01); *A61H 1/024* (2013.01); *A61H 1/0266* (2013.01);
(Continued)

(58) Field of Classification Search
CPC .......... A61H 1/00; A61H 1/02; A61H 1/0237; A61H 1/024; A61H 1/0244; A61H 1/0255;
(Continued)

(56) References Cited

U.S. PATENT DOCUMENTS 4,549,534 A * 10/1985 Zagorski .............. A61H 1/0259 601/104
4,834,073 A * 5/1989 Bledsoe ............... A61H 1/0259 601/34
(Continued)

FOREIGN PATENT DOCUMENTS

| | | | |
|---|---|---|---|
| KR | 10-1059828 | B1 | 8/2011 |
| KR | 10116390 | B1 | 2/2012 |
| KR | 10-1317817 | B1 | 10/2013 |

*Primary Examiner* — Colin W Stuart
(74) *Attorney, Agent, or Firm* — Scale LLP; Seongyoune Kang

(57) ABSTRACT

Proposed is a rehabilitation exercise device for upper and lower limbs. The rehabilitation exercise device is characterized by including: a first support supporting a user's hand or foot; a second support supporting a user's forearm or calf; a pair of first hinges rotatably connecting the first support and the second support to each other; a third support supporting a user's upper arm or thigh; a pair of second hinges rotatably connecting the second support and the third support to each other; and a drive module selectively mounted on any one of the pair of first hinges and the pair of second hinges, and configured to pivot the first support or the second support.

14 Claims, 33 Drawing Sheets

(30) Foreign Application Priority Data

Apr. 10, 2020 (KR) ........................ 10-2020-0043958
Oct. 29, 2020 (KR) ........................ 10-2020-0141796

(52) U.S. Cl.
CPC ......... *A61H 1/0277* (2013.01); *A61H 1/0285* (2013.01); *A61H 2201/1638* (2013.01); *A61H 2201/1642* (2013.01)

(58) Field of Classification Search
CPC .. A61H 1/0266; A61H 1/0274; A61H 1/0277; A61H 1/0281; A61H 1/0285; A61H 1/0288; A61H 2001/027; A61H 2205/06; A61H 2205/062; A61H 2205/065; A61H 2205/10; A61H 2205/102; A61H 2205/104; A61H 2205/106; A61H 2205/108; A61H 2205/12; A61H 2201/1638; A61H 2201/1642
See application file for complete search history.

(56) References Cited

U.S. PATENT DOCUMENTS

| | | | | | |
|---|---|---|---|---|---|
| 4,930,497 | A * | 6/1990 | Saringer | A61H 1/0259 | 601/34 |
| 4,974,830 | A * | 12/1990 | Genovese | A61H 1/0259 | 601/24 |
| 5,117,814 | A * | 6/1992 | Luttrell | A61H 1/0266 | 601/33 |
| 5,399,147 | A * | 3/1995 | Kaiser | A61H 1/0255 | 601/16 |
| 6,146,341 | A * | 11/2000 | Sato | A61H 1/0274 | 482/44 |
| 11,819,468 | B2 * | 11/2023 | Choi | A61H 1/0285 | |
| 2007/0038161 | A1 * | 2/2007 | Bonutti | A61F 5/013 | 601/5 |
| 2010/0036302 | A1 * | 2/2010 | Shimada | A61H 3/00 | 602/23 |
| 2019/0021932 | A1 * | 1/2019 | Roh | A61H 1/0244 | |
| 2019/0283235 | A1 * | 9/2019 | Nam | A61H 3/00 | |

* cited by examiner

[FIG. 1]
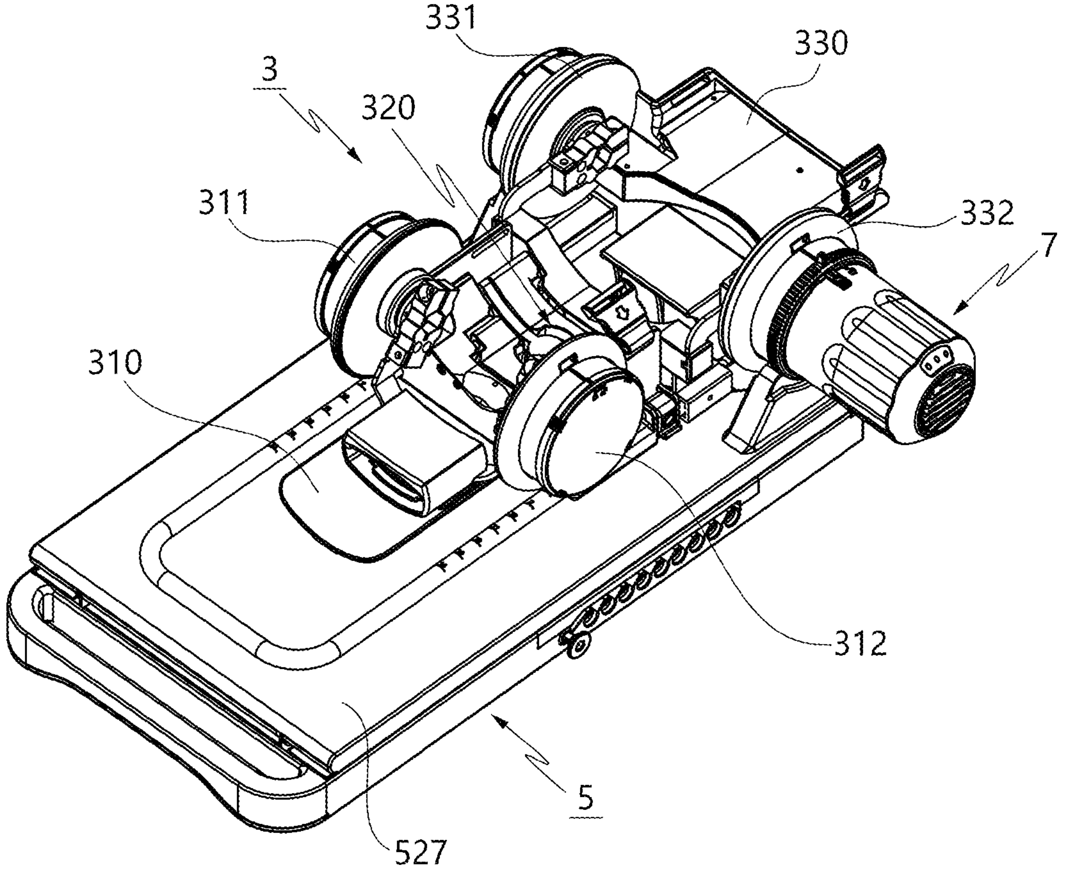

[FIG. 2]
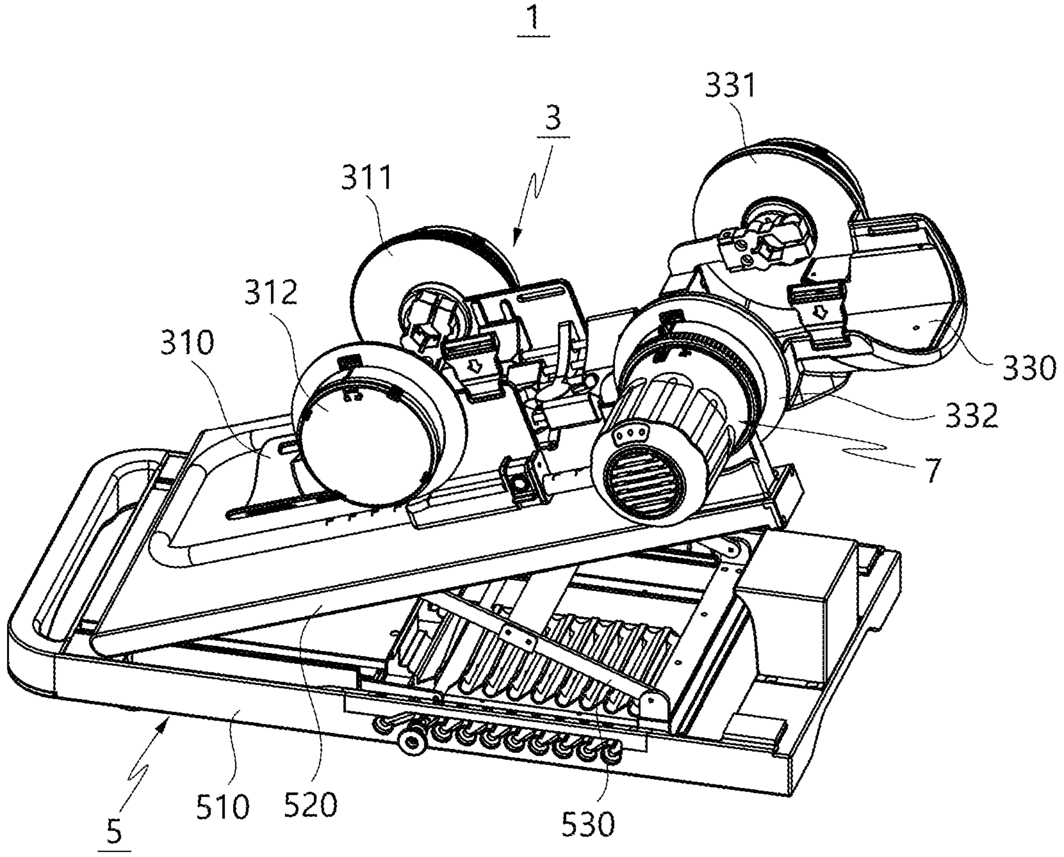

[FIG. 3]
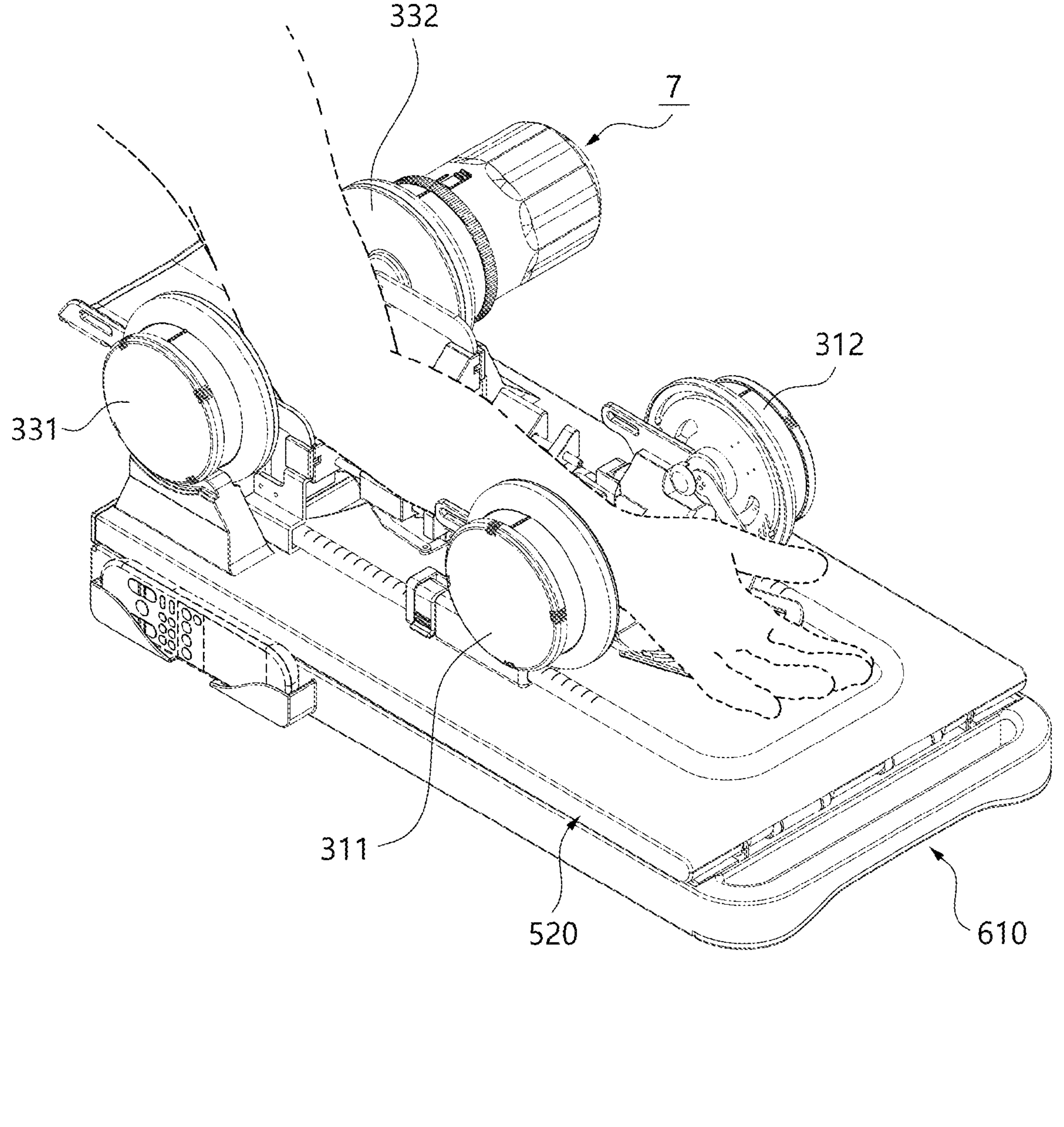

[FIG. 4]
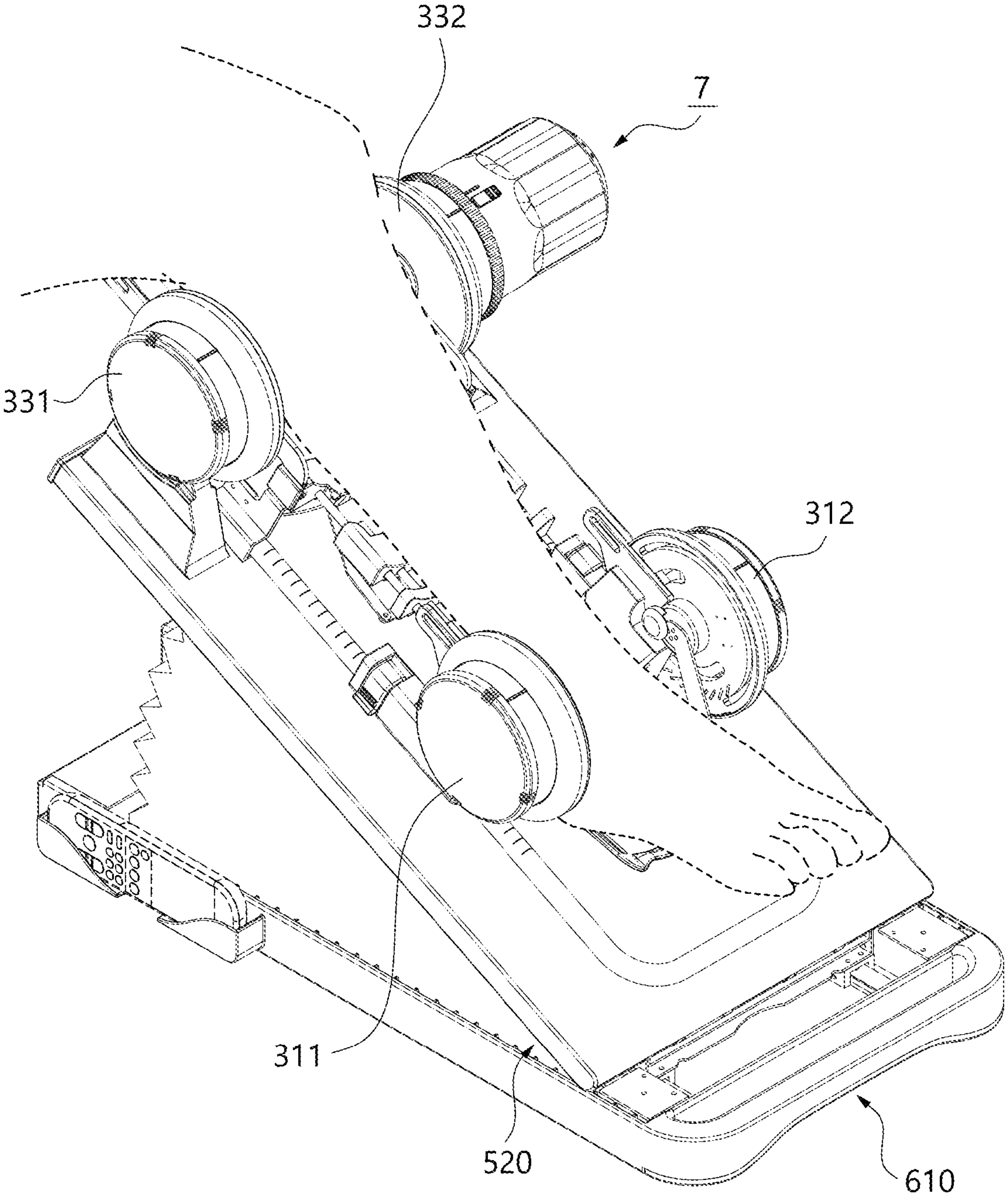

[FIG. 5]
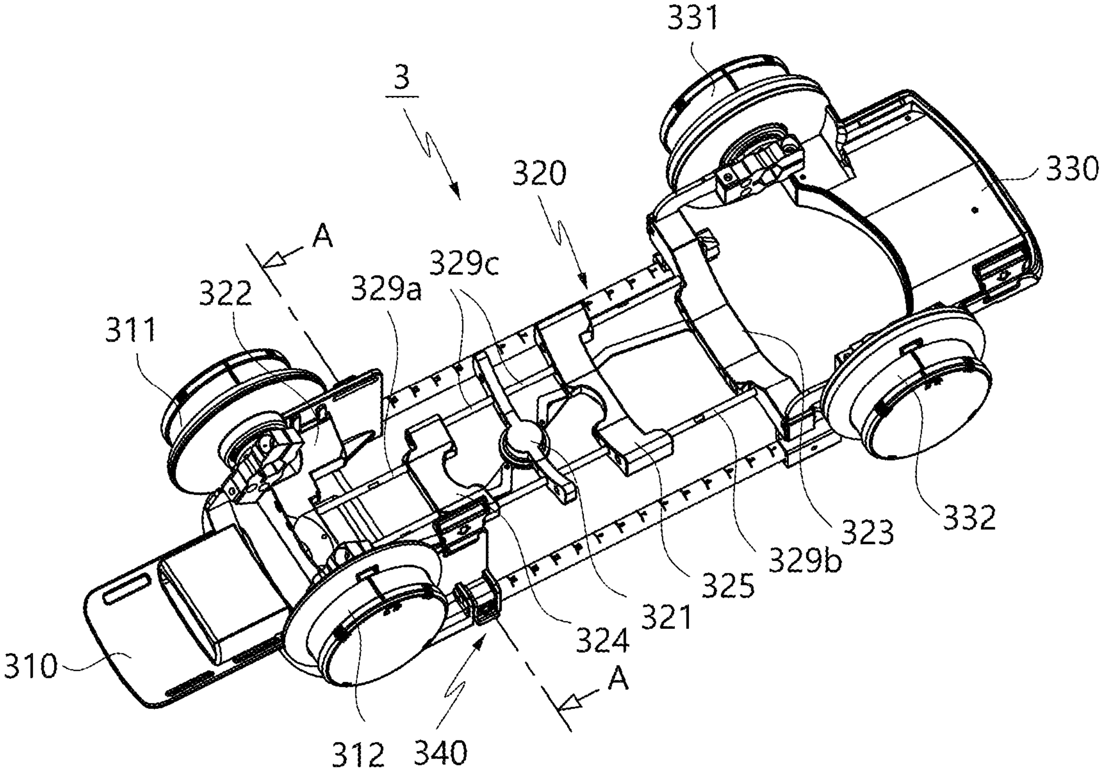

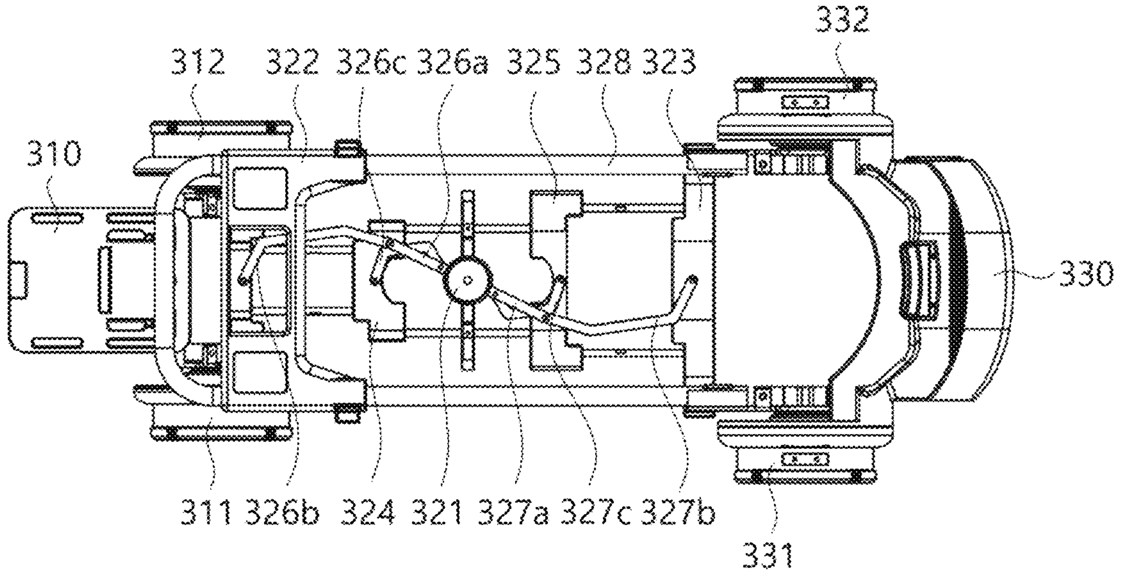
[FIG. 6(a)]
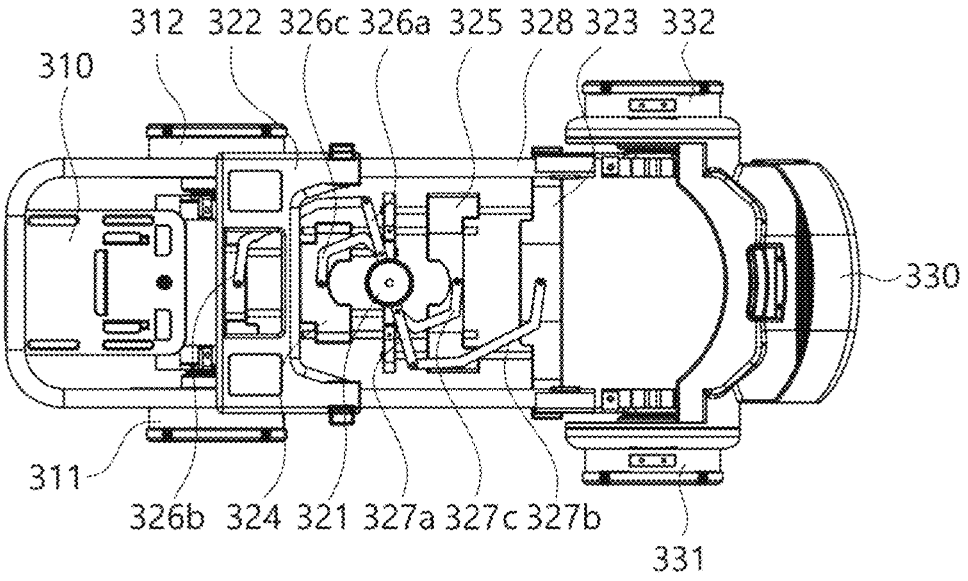
[Fig. 6(b)]

[FIG. 7]
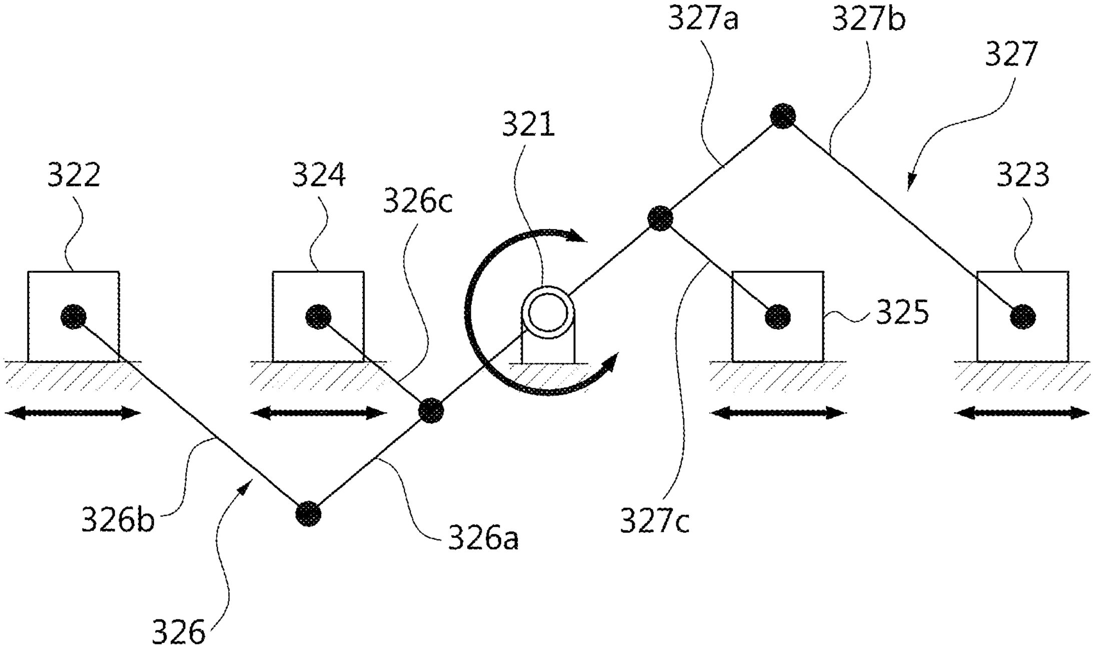

[FIG. 8]
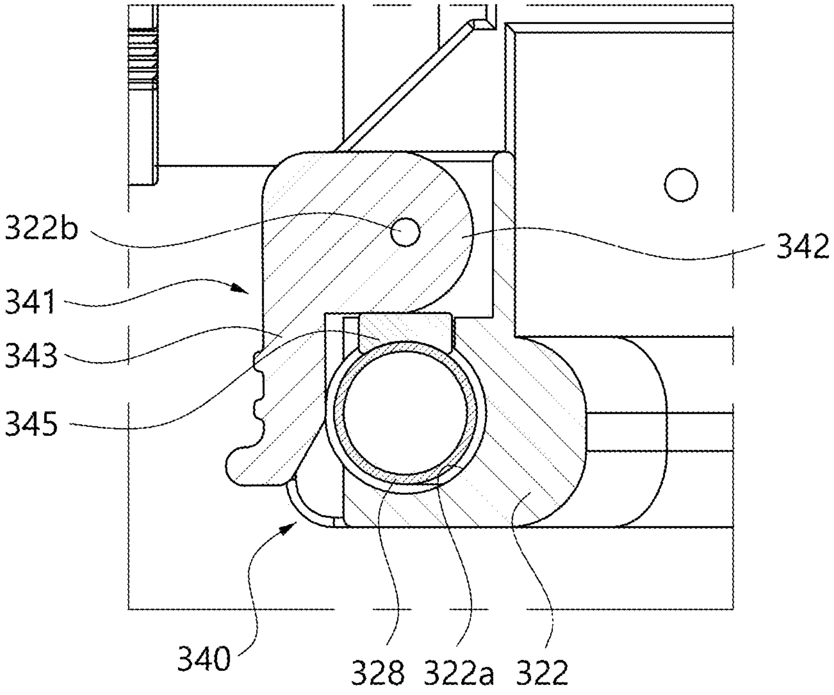

[FIG. 9]
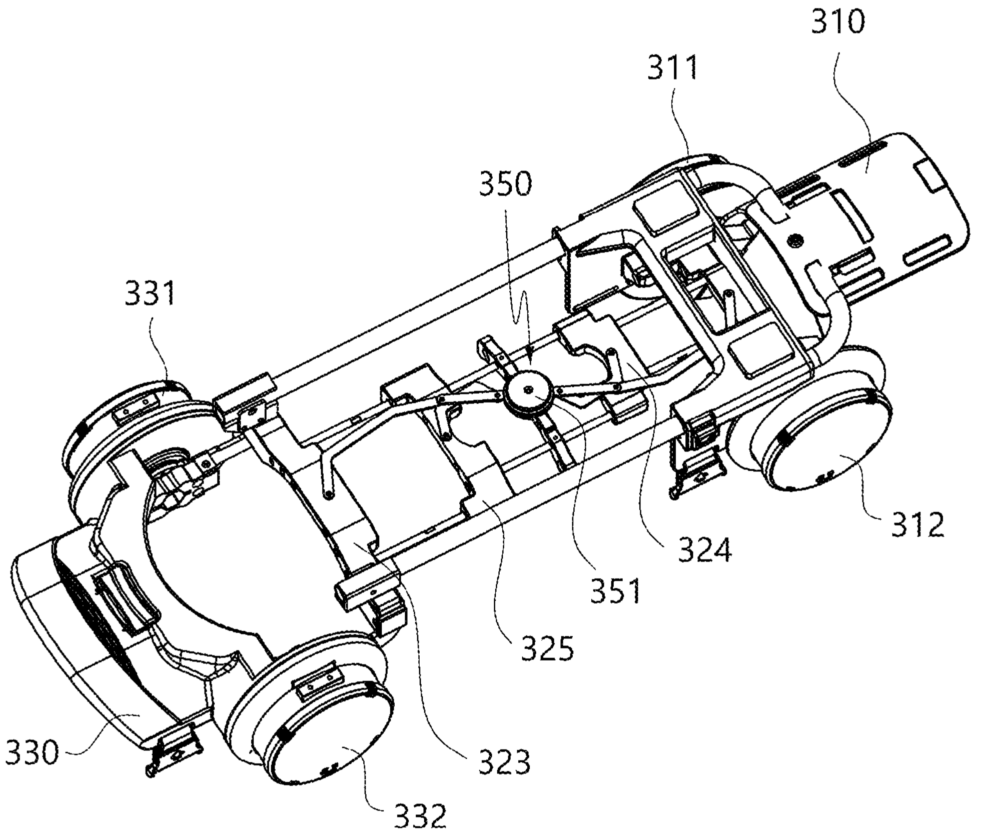

[FIG. 10]
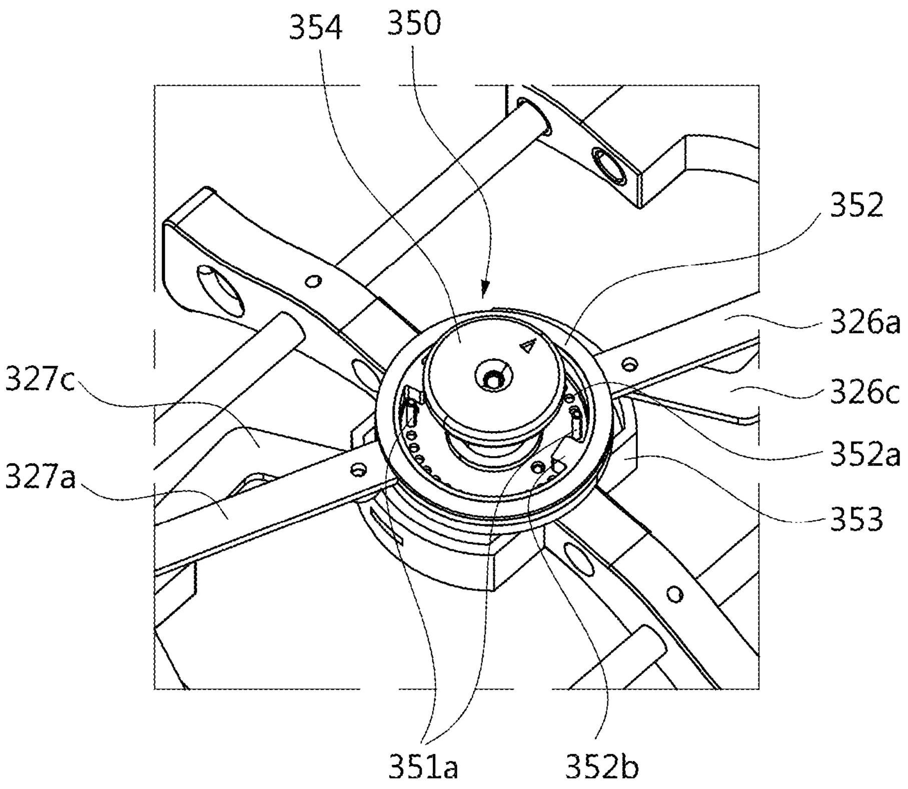

[FIG. 11]
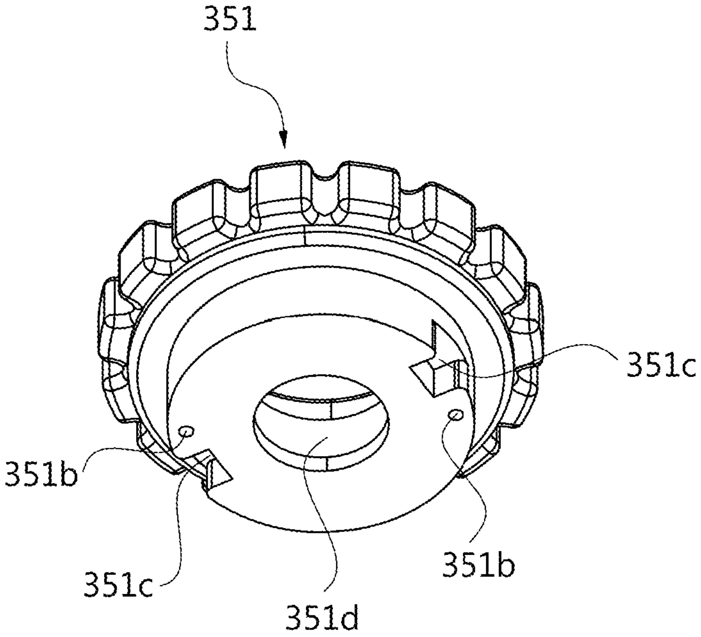

[FIG. 12]
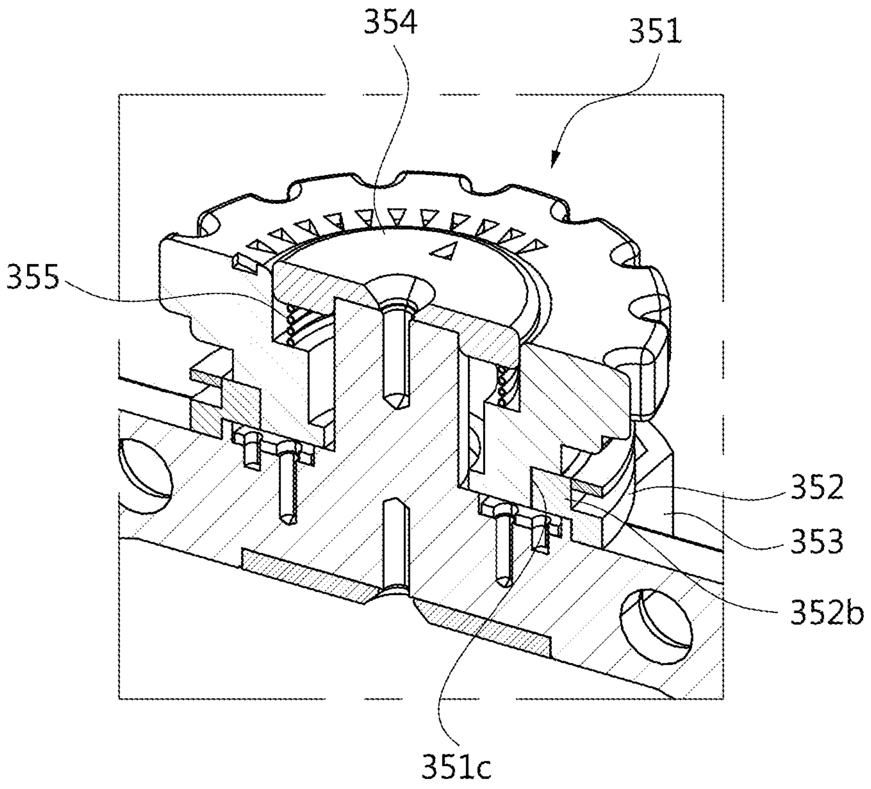

[FIG. 13]
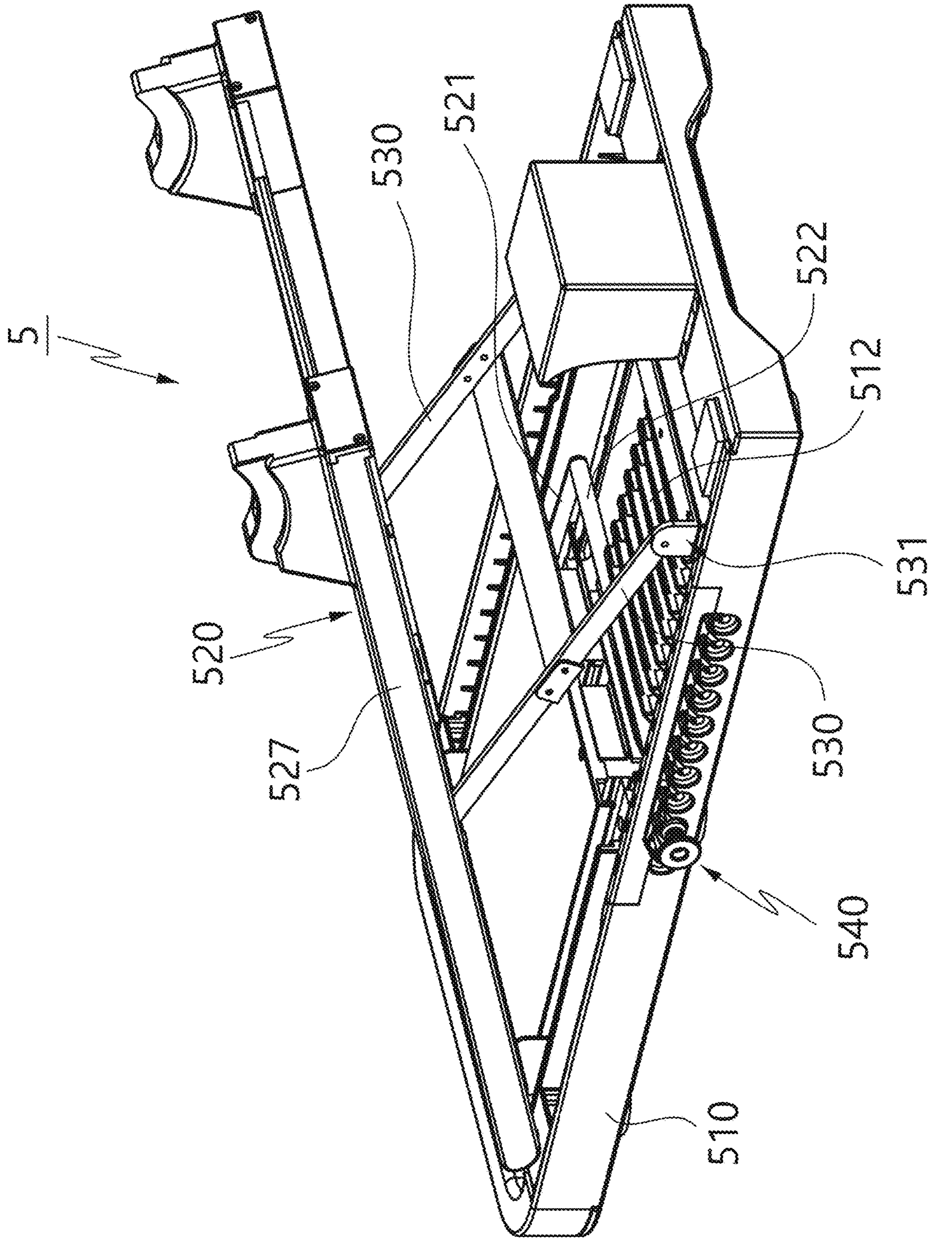

[FIG. 14]
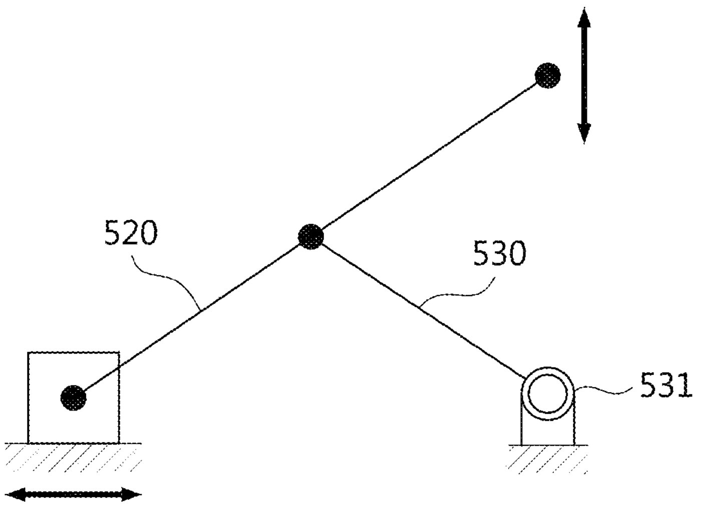

[FIG. 15]
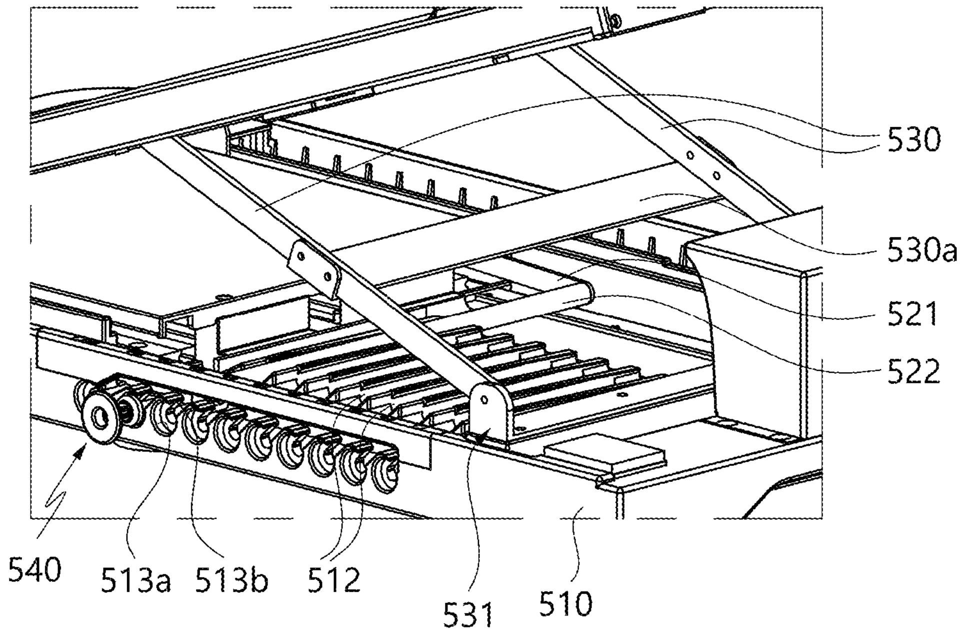

[FIG. 16]
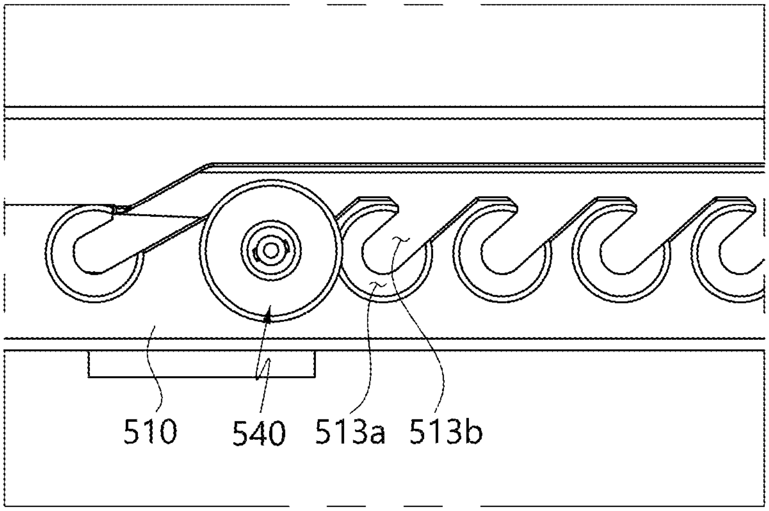

[FIG. 17]
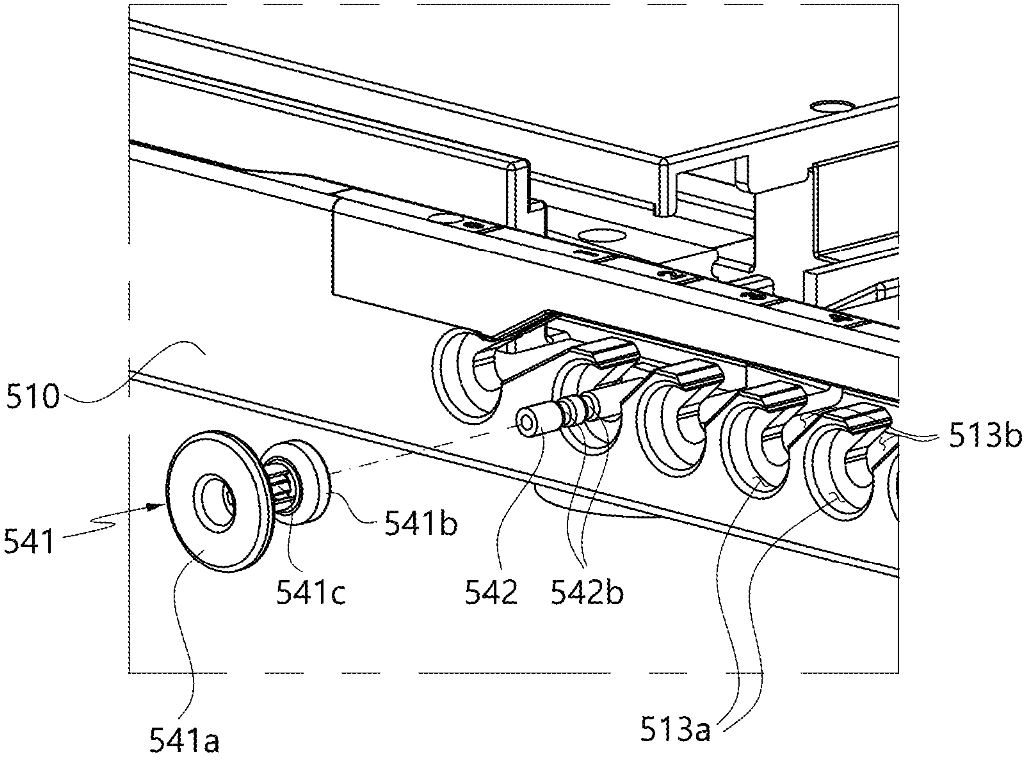

[FIG. 18]
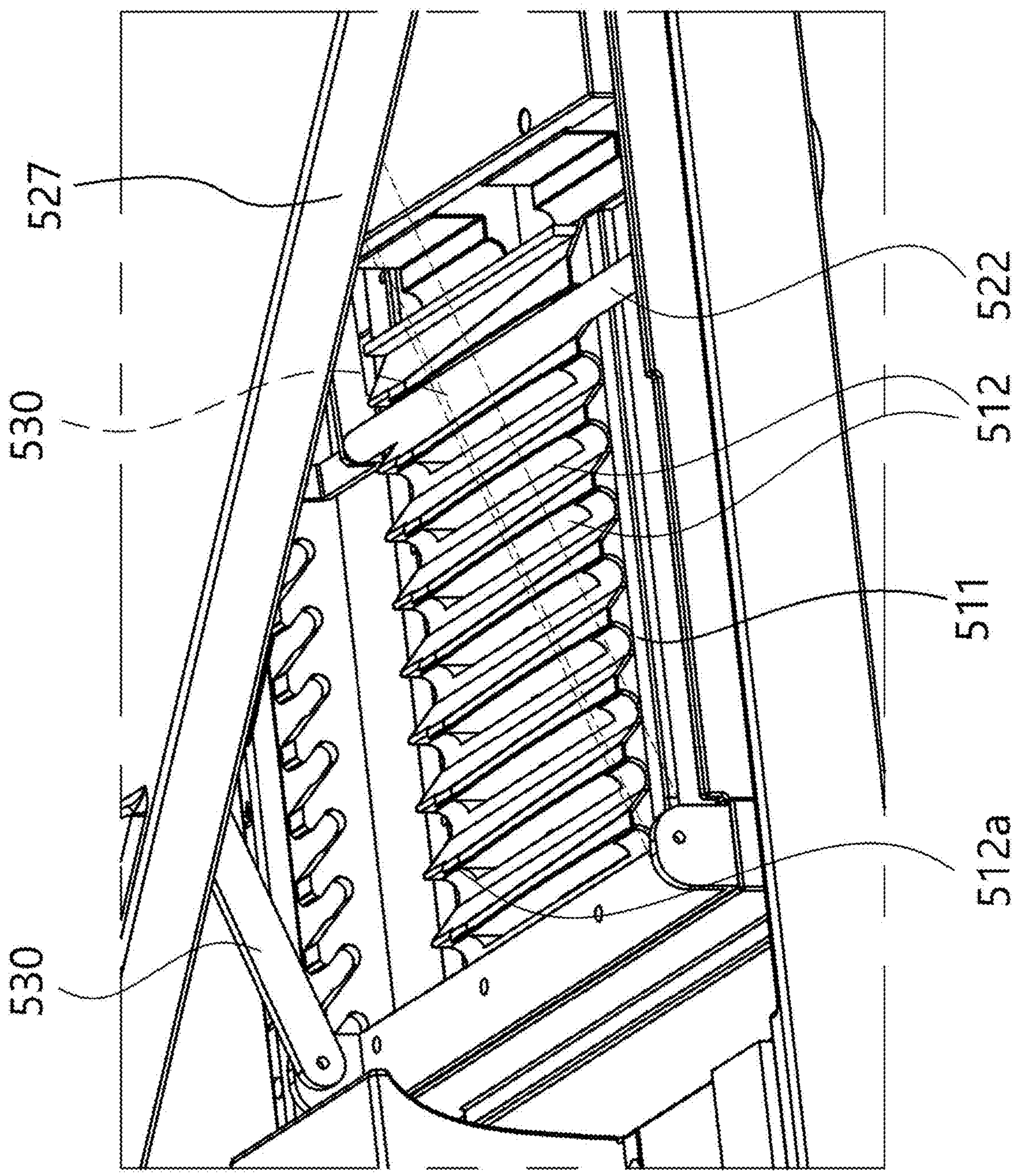

[FIG. 19]
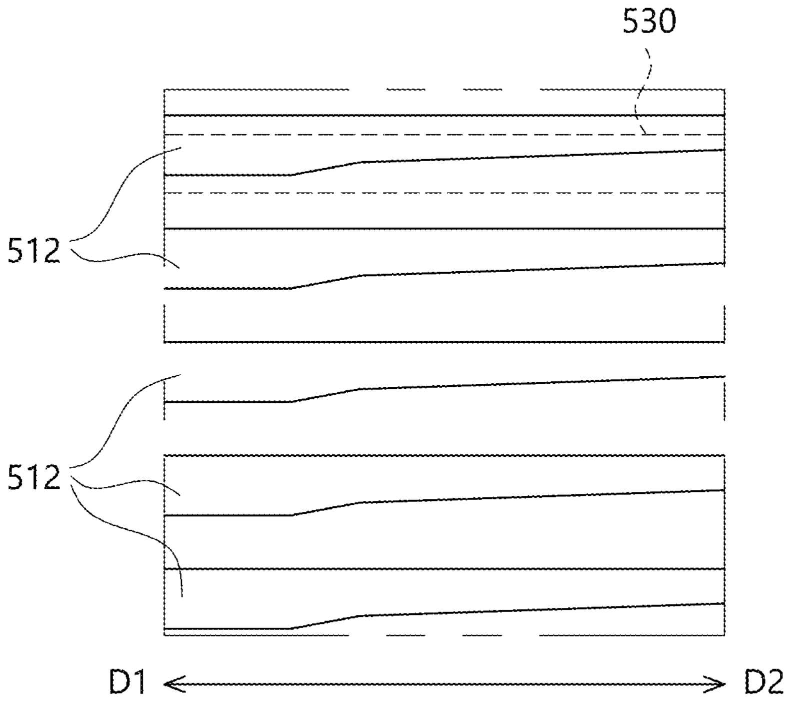

[FIG. 20]
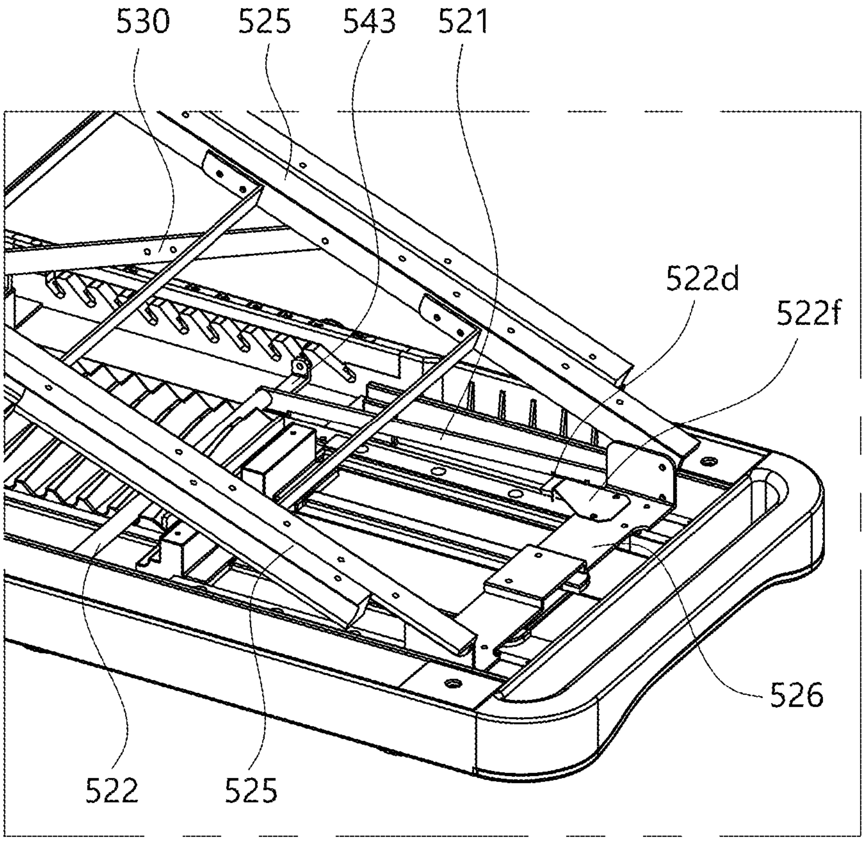

[FIG. 21]
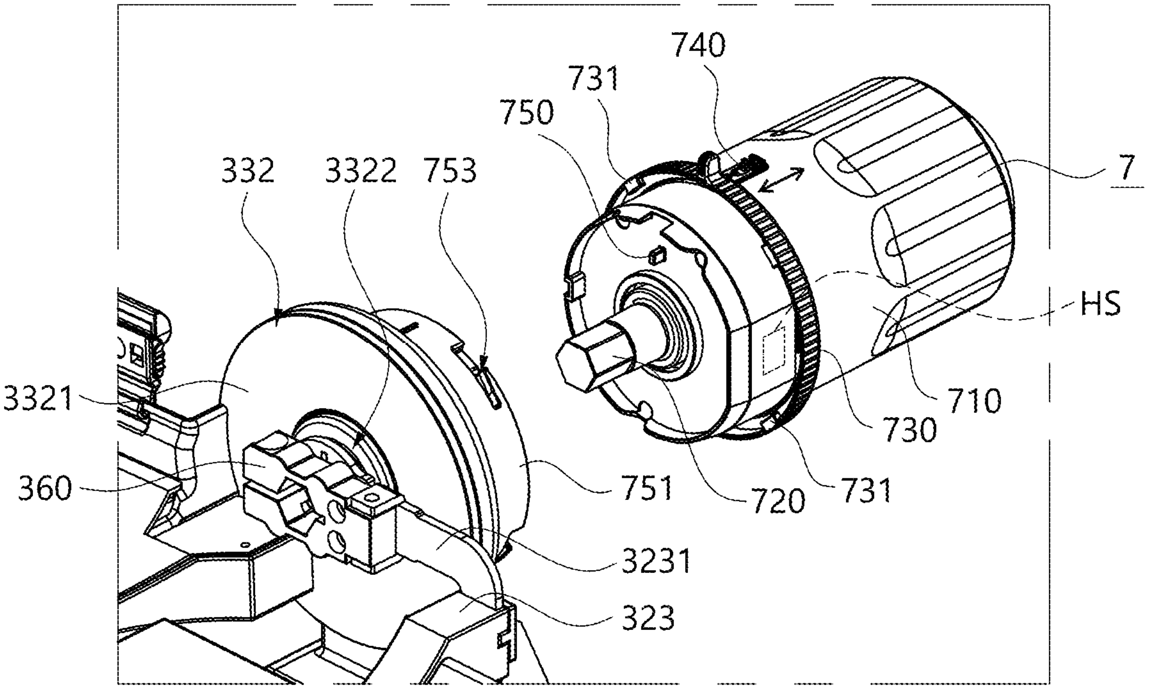

[FIG. 22]
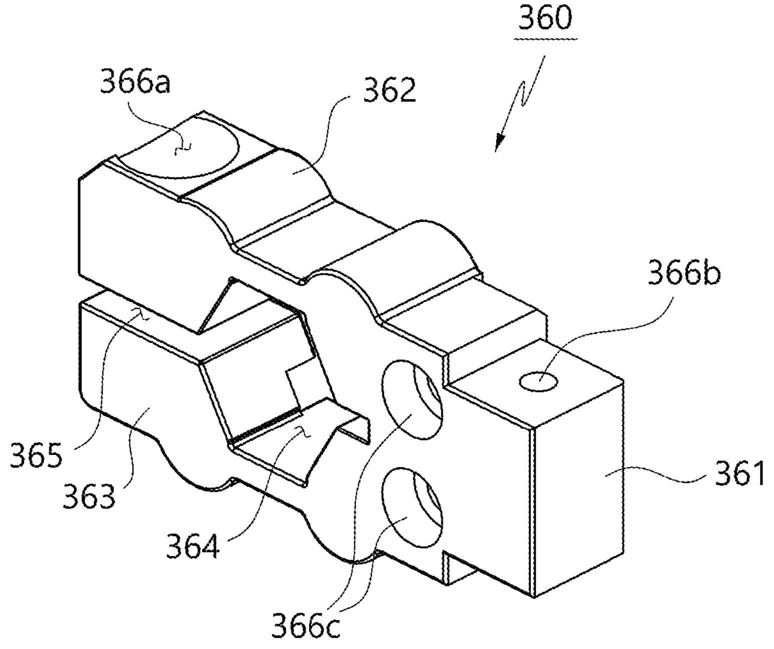

[FIG. 23]
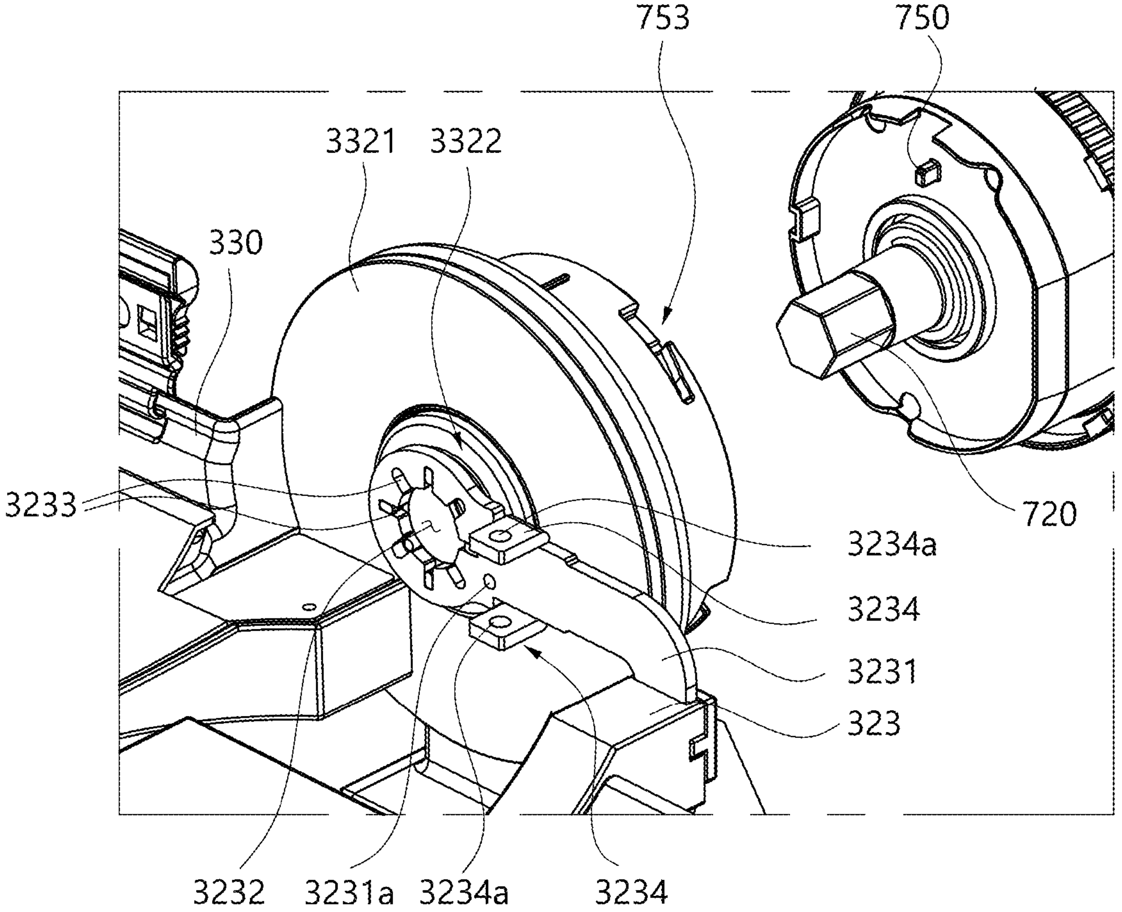

[FIG. 24]
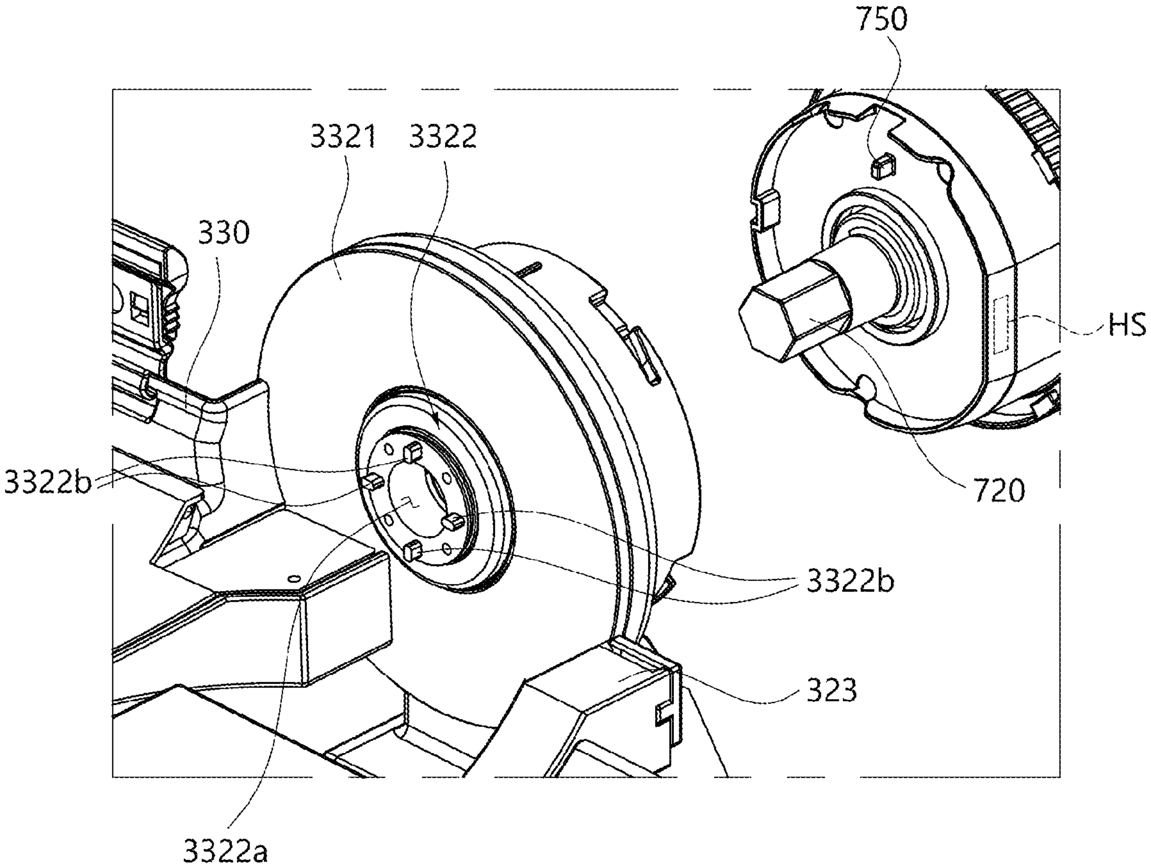

[FIG. 25]
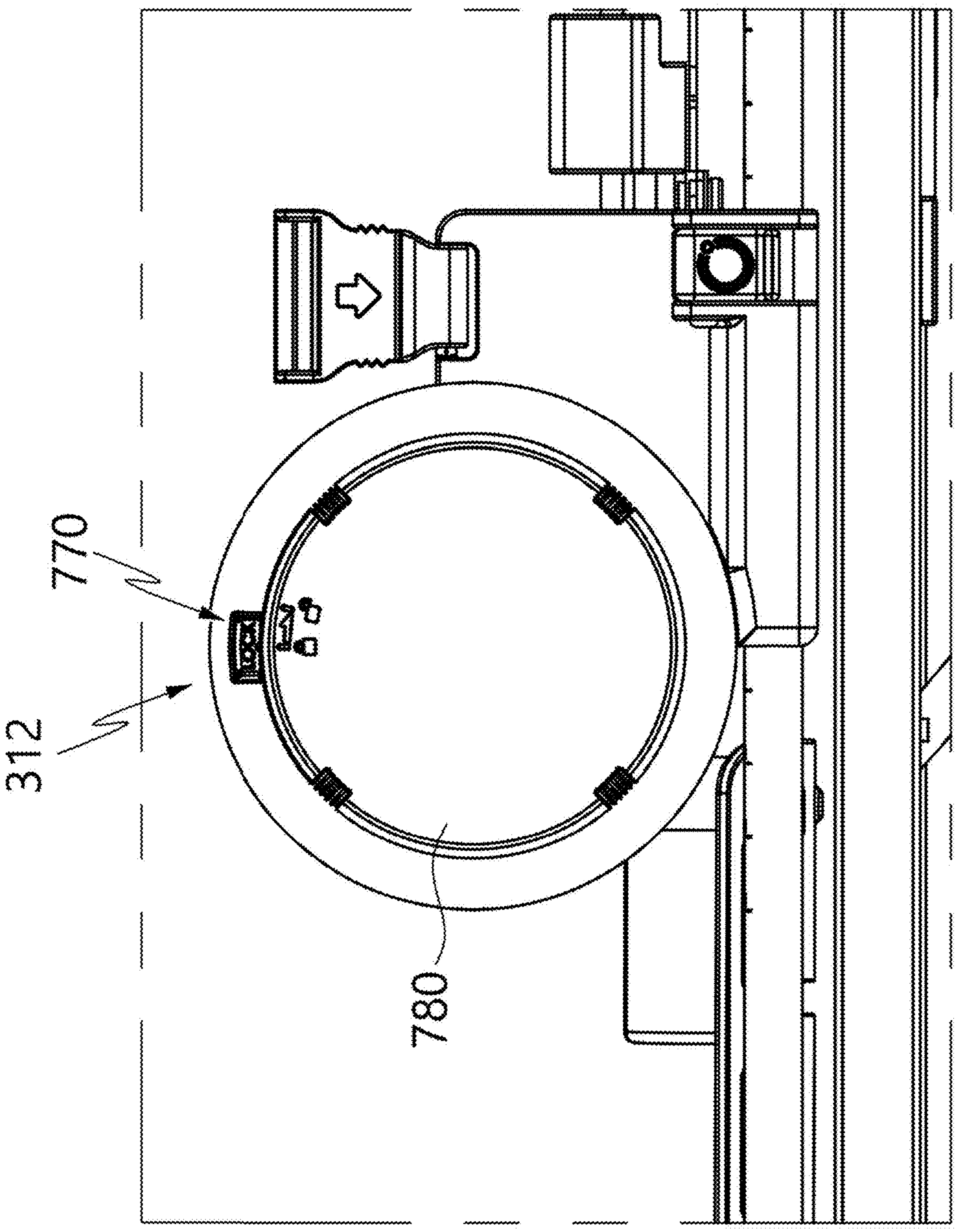

[FIG. 26]
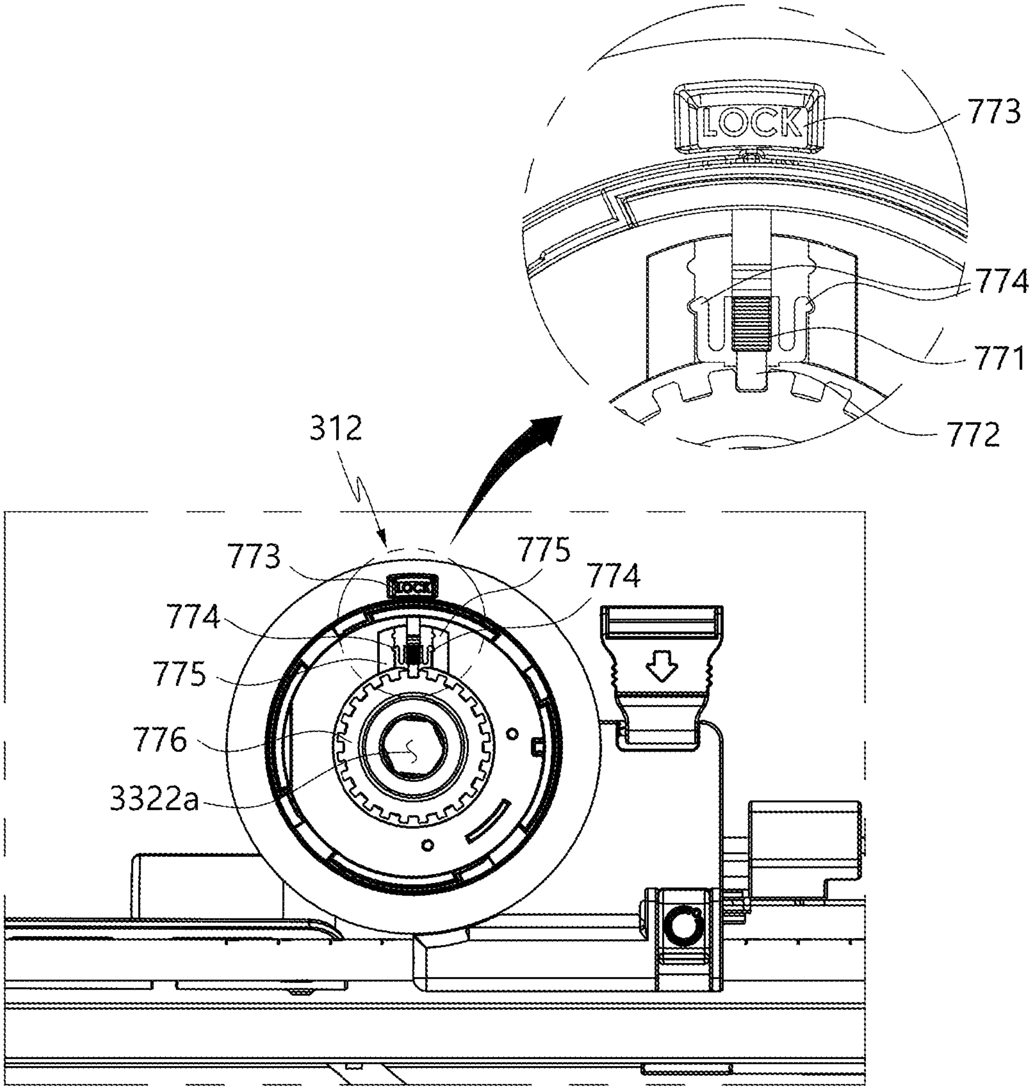

[FIG. 27]
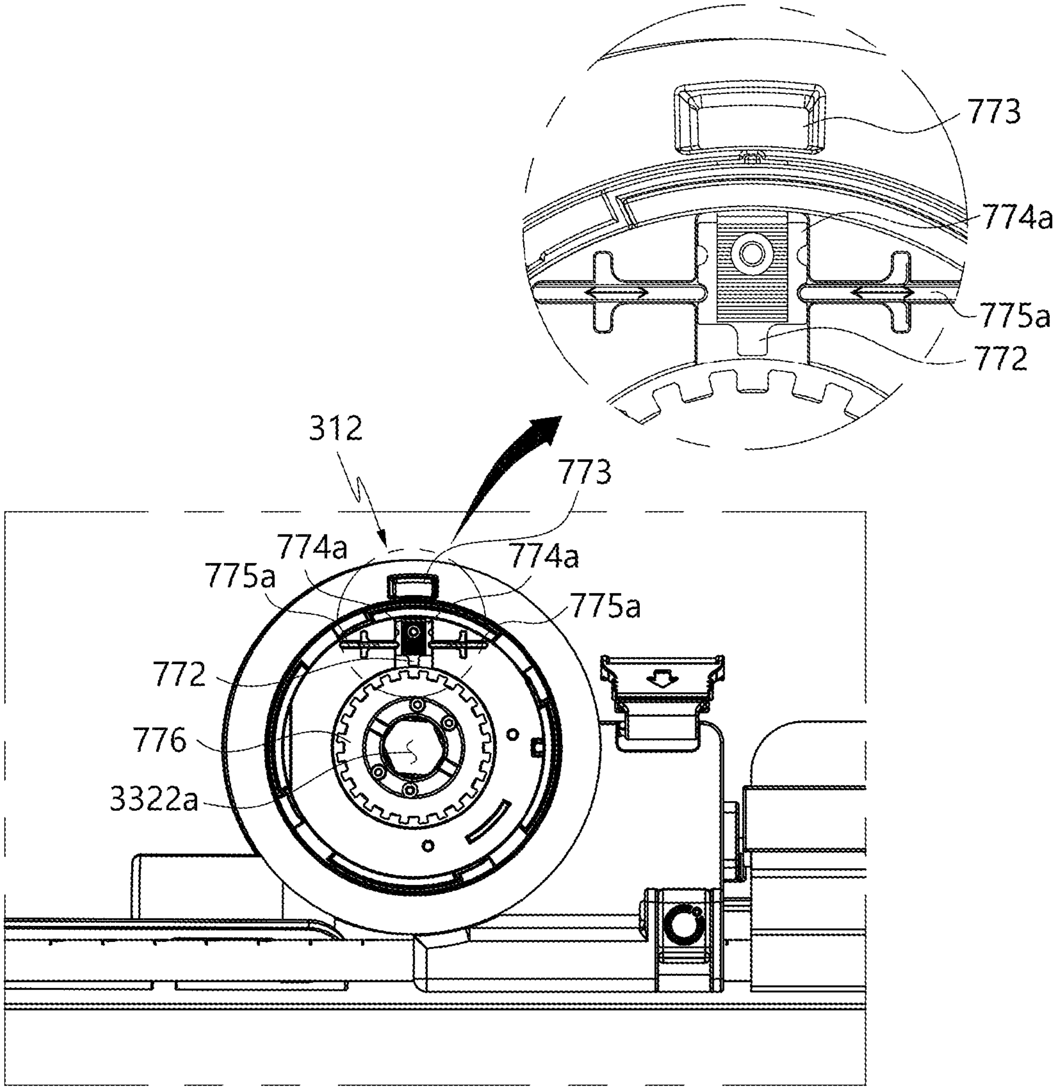

[FIG. 28]
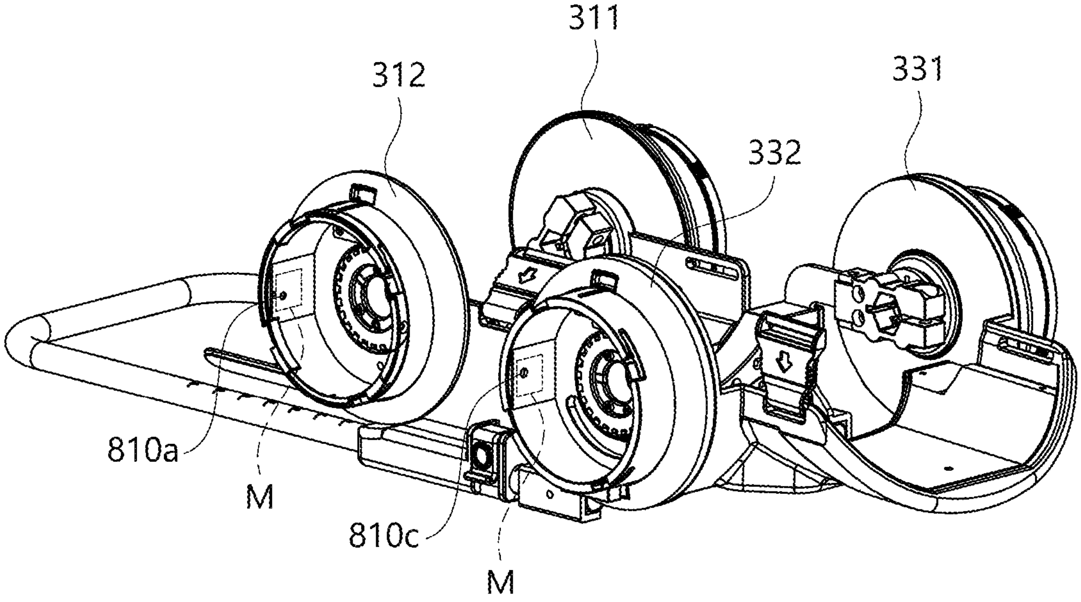

[FIG. 29]
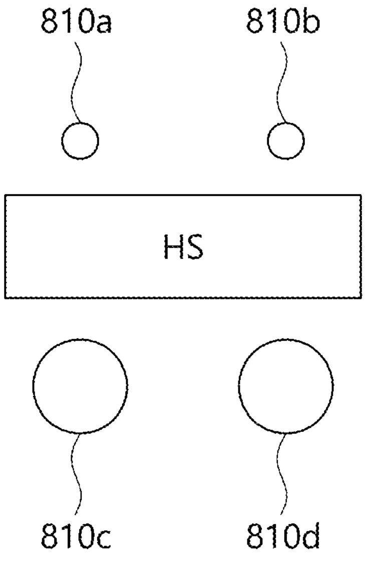

[FIG. 30]
(a)
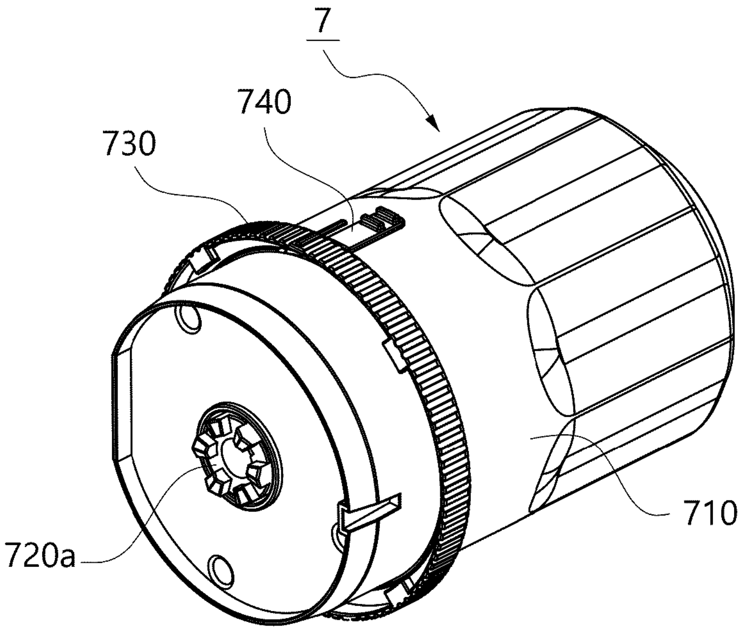
(b)
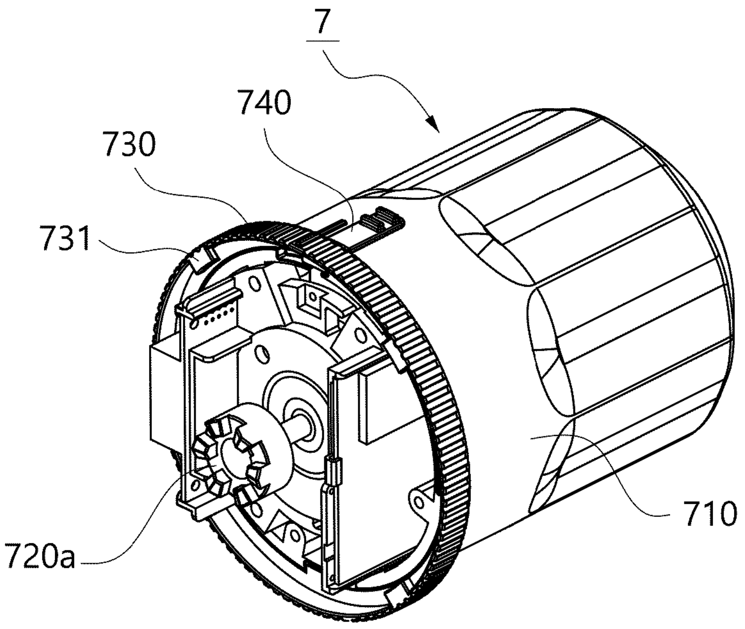

[FIG. 31]
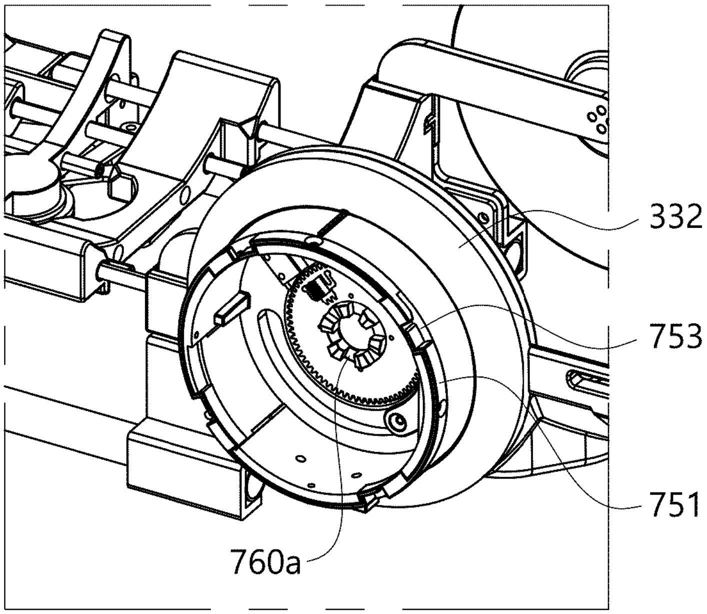

[FIG. 32]
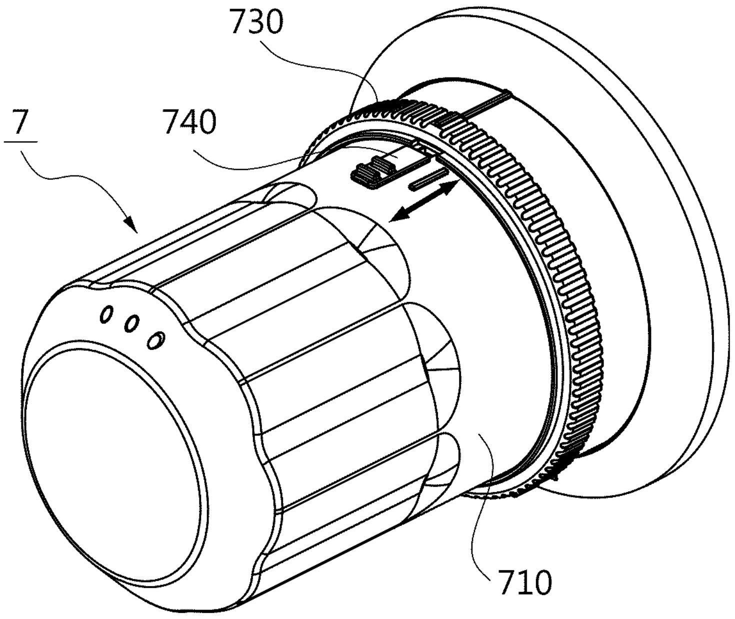

[FIG. 33]
(a)
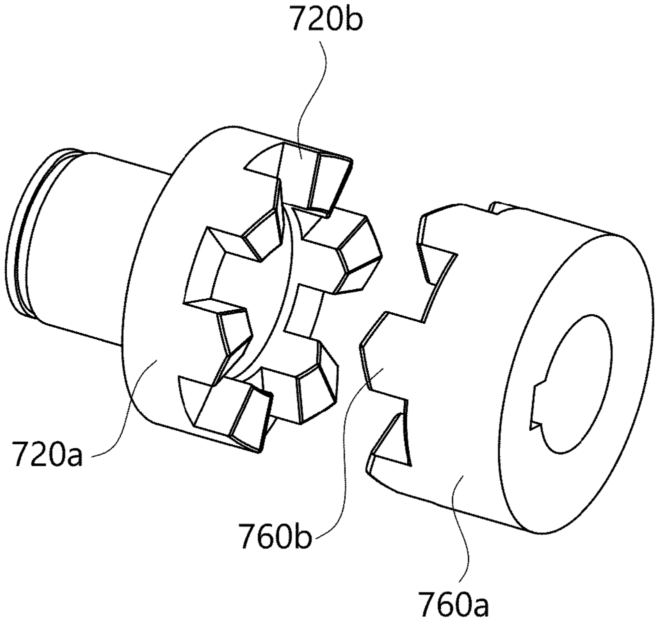
(b)
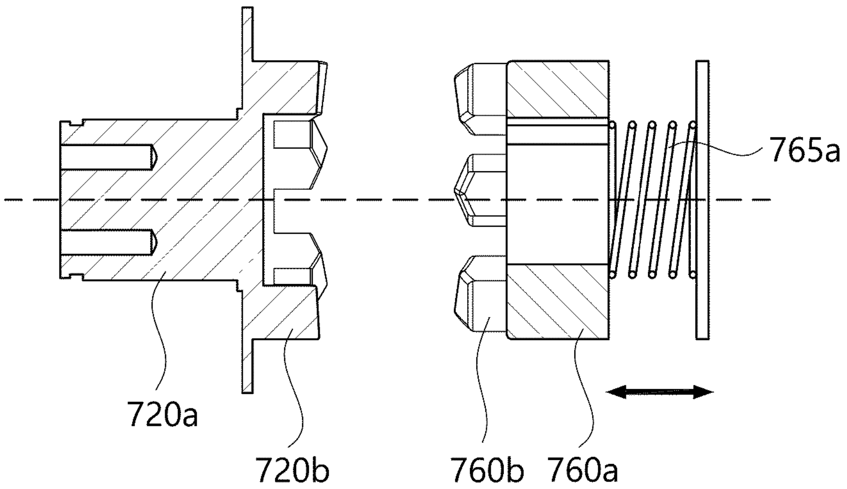

REHABILITATION EXERCISE DEVICE FOR UPPER AND LOWER LIMBS

CROSS-REFERENCE TO RELATED APPLICATIONS

This patent application is a U.S. national stage application of International Application No. PCT/KR2020/015125, filed Nov. 2, 2020 and the entire contents of which are incorporated herein by reference, which claims priority to Korean Application No. 10-2019-0146775, filed Nov. 15, 2019 and the entire contents of which are incorporated herein by reference, Korean Application No. 10-2020-0022970, filed Feb. 25, 2020 and the entire contents of which are incorporated herein by reference, Korean Application No. 10-2020-0043958, filed Apr. 10, 2020 and the entire contents of which are incorporated herein by reference, and Korean Application No. 10-2020-0141796, filed Oct. 29, 2020 and the entire contents of which are incorporated herein by reference.

BACKGROUND OF THE INVENTION

Field of the Invention

The present disclosure relates generally to a rehabilitation exercise device for upper and lower limbs. More particularly, the present disclosure relates to a rehabilitation exercise device for upper and lower limbs, capable of enabling a user to perform an upper or lower limb rehabilitation exercise by placing his/her upper or lower limb thereon.

Description of the Related Art

In general, each joint of a human body has a structure in which neighboring parts of the joint are rotatable with respect to the joint.

Meanwhile, people such as the elderly or rehabilitation patients with weak muscles have difficulty in moving their joints normally compared to healthy people, and even though they need exercise, it is difficult for them to exercise with typical exercise equipment in reality.

When a muscle is weakened or a damaged joint is left unattended over time, the muscle or joint becomes gradually stiff, causing pain when moving, which may interfere with normal activities even when damaged nerves recover.

In addition, patients who have undergone wrist and/or shoulder joint surgery have difficulty exercising by themselves, so joints of the wrist and/or shoulder may become stiff as muscles are weakened and nutrition supply is poor.

Thus, in order to prevent joint deformity and return to normal activities, affected people need to perform rehabilitation exercises accompanied by pain for a long period of time.

In an effort to solve this problem, as a related-art rehabilitation exercise device for enabling the elderly or rehabilitation patients with weak muscles to perform joint exercises through passive rehabilitation, a robotic shoulder apparatus for stroke patient's rehabilitation has been disclosed in Korean Patent No. 10-1163903.

Such a rehabilitation exercise device disclosed in the related art has an unnecessarily complex structure, and thus is problematic in that it is difficult to provide benefits to more users because they need to bear the cost of purchase and installation. In addition, the rehabilitation exercise device is difficult to move, so most users need to move for exercise to the place where the device is located, which is cumbersome.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent document 1) Korean Patent No. 10-1163903 (Title of invention: robotic shoulder apparatus for stroke patient's rehabilitation, registration date: 2012.07.02)

SUMMARY OF THE INVENTION

Accordingly, the present disclosure has been made keeping in mind the above problems occurring in the related art, and an objective of the present disclosure is to provide a rehabilitation exercise device for upper and lower limbs, the rehabilitation exercise device being capable of: enabling a user to perform a rehabilitation exercise by simply adjusting a mounting angle of his/her upper or lower limb in response to the condition of a rehabilitation patient; being simplified in structure, thereby minimizing the cost of purchase and installation; being convenient to move, thereby enabling the elderly or rehabilitation patients with weak muscles to easily move and place the device on a desk, chair, mattress, etc., and then to easily place their upper limb or lower limb on the device; and enabling the user to perform a rehabilitation exercise of each joint of his/her upper limb or lower limb to resemble normal motion.

In order to achieve the above objective, according to one aspect of the present disclosure, there is provided a rehabilitation exercise device for upper and lower limbs, the rehabilitation exercise device including: a first support supporting a user's hand or foot; a second support supporting a user's forearm or calf; a pair of first hinges rotatably connecting the first support and the second support to each other; a third support supporting a user's upper arm or thigh; a pair of second hinges rotatably connecting the second support and the third support to each other; and a drive module selectively mounted on any one of the pair of first hinges and the pair of second hinges, and configured to pivot the first support or the second support.

Here, each of the first hinges or each of the second hinges comprises a rotary shaft hole configured to receive a drive shaft of the drive module; and the drive module comprises the drive shaft passing through the rotary shaft hole and coupled to the first support or the second support when the drive module is mounted on the first hinge or the second hinge, the drive shaft thus pivoting the first support or the second support.

Furthermore, the first support or the second support comprises: a shaft coupling bracket extending toward a rotary shaft of a drive motor; and a drive shaft fixing member fixing the drive shaft inserted through the rotary shaft hole to the shaft coupling bracket.

Furthermore, the drive shaft has a polygonal shape in cross-section; and the drive shaft fixing member comprises a polygonal fixing hole having a polygonal inner diameter corresponding to the cross-sectional shape of the drive shaft.

Furthermore, the drive shaft fixing member comprises: a bracket fastening portion provided at a first side thereof with respect to the polygonal fixing hole, and fastened to the shaft coupling bracket; and a pair of tightening members provided at a second side thereof with respect to the polygonal fixing hole at positions spaced apart from each other. Also, in a state in which the drive shaft is inserted into the polygonal fixing hole, the pair of tightening members are approached to each other, so that the drive shaft inserted into the polygonal fixing hole is tightened and fixed.

Furthermore, any one of the pair of tightening members comprises a first tightening hole passing through a side thereof; and a remaining one of the pair of tightening members comprises a second tightening hole for fastening a tightening bolt passing through the first tightening hole so as to adjust a distance between the pair of tightening members.

Furthermore, the bracket fastening portion is fastened to the shaft coupling bracket through bolt fastening.

Furthermore, each of the first hinges or each of the second hinges comprises: a first rotary part configured to be rotated in conjunction with the first support or the second support in response to rotation of the drive shaft; and a second rotary part configured to be freely rotatable with respect to the first rotary part. Here, the first rotary part and the second rotary part are coaxially coupled around the rotary shaft hole; and the first rotary part is axially coupled to the shaft coupling bracket to be rotated relative to the second rotary part in conjunction with rotation of the drive shaft.

Furthermore, the shaft coupling bracket comprises: a bracket coupling hole formed corresponding to the rotary shaft hole, and allowing passage of the drive shaft passing through the rotary shaft hole; and a plurality of rotation synchronization holes passing through a plate surface of the shaft coupling bracket along an outer periphery of the bracket coupling hole. Here, the first rotary part further comprises a rotation synchronization protrusion inserted into each of the rotation synchronization holes when the shaft coupling bracket is fastened to the first rotary part, and allowing the first rotary part to be rotatable in conjunction with rotation of the shaft coupling bracket.

Furthermore, the drive module comprises: a body housing in which a drive motor is accommodated; a drive shaft to which a rotary shaft of the drive motor is connected; and a ring member provided on an outer periphery of the body housing. Here, each of the first hinges or each of the second hinges comprises: a ring coupling portion to which the ring member is coupled; and a hinge shaft with which the drive shaft is meshed.

Furthermore, the drive module comprises: a body housing in which a drive motor is accommodated; a drive shaft to which a rotary shaft of the drive motor is connected; and a ring member provided on an outer periphery of the body housing. Here, each of the first hinges or each of the second hinges comprises: a ring coupling portion to which the ring member is coupled; and a hinge shaft with which the drive shaft is meshed.

Furthermore, the rehabilitation exercise device further comprises: a mounting protrusion formed on the ring member; and a catching portion formed on the ring coupling portion, and configured such that when the ring member is rotated and coupled to the ring coupling portion, the mounting protrusion is rotated and fitted into the catching portion.

Here, the rehabilitation exercise device further comprises: a catching lever provided on the body housing, and configured to restrain rotation of the ring member by being inserted into the ring member.

Furthermore, the drive shaft and the hinge shaft respectively comprise pluralities of jaws that circumferentially alternately protrude and are meshed with each other.

Furthermore, each of the jaws is configured such that opposite sides thereof are inclined.

Here, the rehabilitation exercise device further comprises: an elastic member provided on any one of the drive shaft and the hinge shaft, and configured to generate an elastic force acting on a remaining one of the drive shaft and the hinge shaft so that the drive shaft and the hinge shaft are connected to each other.

According to the present disclosure, the rehabilitation exercise device for upper and lower limbs, the rehabilitation exercise device being capable of: enabling a user to perform a rehabilitation exercise by simply adjusting a mounting angle of his/her upper or lower limb in response to the condition of a rehabilitation patient; being simplified in structure, thereby minimizing the cost of purchase and installation; being convenient to move, thereby enabling the elderly or rehabilitation patients with weak muscles to easily move and place the device on a desk, chair, mattress, etc., and then to easily place their upper limb or lower limb on the device; and enabling the user to perform a rehabilitation exercise of each joint of his/her upper limb or lower limb to resemble normal motion.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a perspective view illustrating a rehabilitation exercise device for upper and lower limbs according to an embodiment of the present disclosure;

FIG. 2 is a view illustrating a state in which a base plate illustrated in FIG. 1 is tilted from a mounting plate;

FIG. 3 is a view illustrating a state of rehabilitating an upper limb using the rehabilitation exercise device according to the embodiment of the present disclosure;

FIG. 4 is a view illustrating a state of rehabilitating a lower limb using the rehabilitation exercise device according to the embodiment of the present disclosure;

FIG. 5 is a perspective view illustrating a rehabilitation exercise unit illustrated in FIG. 1;

FIGS. 6A and 6B are plan views of FIG. 5 illustrating a length adjustment process of a second support according to the present disclosure;

FIG. 7 is a view illustrating the mechanism for operating the second support illustrated in FIGS. 6A and 6B;

FIG. 8 is a main part enlarged sectional view illustrating a length stopper illustrated in FIGS. 6A and 6B;

FIG. 9 is a view illustrating another embodiment of a length adjustment process of a second support according to the present disclosure;

FIG. 10 is a main part enlarged perspective view illustrating a rotation stopper illustrated in FIG. 9;

FIG. 11 is a perspective view illustrating a restraining dial illustrated in FIG. 10;

FIG. 12 is a main part enlarged sectional view of FIG. 9;

FIG. 13 is a main part enlarged perspective view illustrating a state in which the mounting plate illustrated in FIG. 1 is erected at a predetermined angle with respect to the base plate;

FIG. 14 is a view illustrating the mechanism for operating the mounting plate illustrated in FIG. 13;

FIG. 15 is a main part enlarged view of FIG. 13;

FIG. 16 is a main part enlarged side view illustrating the mounting plate illustrated in FIG. 12;

FIG. 17 is a main part enlarged perspective view of FIG. 12;

FIG. 18 is a main part enlarged perspective view illustrating the mounting plate according to the present disclosure as viewed in another direction;

FIG. 19 is a view illustrating the structure of a catching protrusion illustrated FIG. 18;

FIG. 20 is a main part enlarged perspective view illustrating the mounting plate according to the present disclosure as viewed in another direction;

FIG. 21 is a perspective view illustrating a drive module according to the present disclosure;

FIG. 22 is an enlarged perspective view illustrating a drive shaft fixing member illustrated in FIG. 21;

FIGS. 23 and 24 are views illustrating the principle of mounting the drive module according to the present disclosure;

FIGS. 25 to 27 are views illustrating a rotation restraining part according to the present disclosure;

FIGS. 28 and 29 are views illustrating a mounting position detecting part according to the present disclosure; and FIGS. 30 to 33 are views illustrating another embodiment of a drive module according to the present disclosure.

DETAILED DESCRIPTION OF THE INVENTION

The present disclosure relates to a rehabilitation exercise device for upper and lower limbs. The rehabilitation exercise device is characterized by including: a base plate; a mounting plate on which a rehabilitation exercise unit is mounted, the rehabilitation exercise unit including a first support for supporting a user's hand or foot, a second support for supporting a user's forearm or calf, a third support for supporting a user's upper arm or thigh, the mounting plate having a first side that is coupled to the base plate to be horizontally movable along a plate surface thereof; and a link member having opposite sides that are rotatably coupled to the base plate and the mounting plate, respectively, and configured to adjust an angle between the base plate and the mounting plate by being rotated when the first side of the mounting plate is moved horizontally along the plate surface of the base plate.

The above and other objectives, features, and advantages of the present disclosure will be more clearly understood from the following detailed description when taken in conjunction with the accompanying drawings. However, it should be understood that the various changes to the following embodiments are possible and the scope of the present disclosure is not limited to the following embodiments. The embodiments of the present disclosure are provided for allowing those skilled in the art to more clearly comprehend the present disclosure, and the scope of the present disclosure should be defined by the appended claims.

Terms used in this specification are selected to describe embodiments and thus should not be construed as the limit of the present disclosure. An element expressed in a singular form in this specification may be plural elements unless it is necessarily singular in the context. The terms "comprise" and/or "comprising" when used in this specification, specify the presence of stated features, but do not preclude the presence or addition of one or more other features. The same reference numerals are used throughout the different drawings to designate the same or similar components. The expression "and/or" is interpreted to include each of enumerated items, and all combinations including one or more items selected from among the enumerated items. Although the terms "first", "second", etc. may be used herein to describe various elements, these elements should not be limited by these terms. These terms are only used to distinguish one element from another element. For example, a first element discussed below could be termed a second element without departing from the scope of the present disclosure.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the present disclosure will be described in detail with reference to the accompanying drawings.

FIGS. 1 to 25 illustrate a rehabilitation exercise device 1 for upper and lower limbs according to an embodiment of the present disclosure.

As illustrated in these drawings, the rehabilitation exercise device 1 according to the embodiment of the present disclosure includes a rehabilitation exercise unit 3 and a holder 5 for supporting the rehabilitation exercise unit 3.

The rehabilitation exercise unit 3 may include: a first support 310 for supporting a user's hand or foot; a second support 320 for supporting a user's forearm or calf; a pair of first hinges 311 and 312 for rotatably connecting the first support 310 and the second support 320 to each other; a third support 330 for supporting a user's upper arm or thigh; and a pair of second hinges 331 and 332 for rotatably connecting the second support 320 and the third support 330 to each other.

The holder 5 includes a base plate 510, and a mounting plate 520 on which the rehabilitation exercise unit 3 is mounted. The base plate 510 and the mounting plate 520 adopt a link-mechanism that converts horizontal motion into vertical motion. The link-mechanism is such that a first side of the mounting plate 520 is installed on the base plate 510 to be horizontally movable along a plate surface thereof, an intermediate region of the mounting plate 520 is connected to a first side of a link member 530, and a second side of the link member 530 is rotatably installed on the base plate 510.

According to the above configuration, as illustrated in FIG. 1, in a state in which the mounting plate 520 is folded to the base plate 510, as illustrated in FIG. 3, upper limb rehabilitation exercise is performed. On the other hand, as illustrated in FIG. 2, in a state in which the mounting plate 520 is erected at a certain angle from the base plate 510 by the link mechanism, as illustrated in FIG. 4, lower limb rehabilitation exercise is performed.

Here, angle adjustment between the mounting plate 520 and the base plate 510, and angle fixing and releasing will be described later.

The rehabilitation exercise unit 3 according to the present disclosure includes a distance adjustment part for adjusting the distance between the first support 310 and the third support 330 by adjusting the length of the second support 320 according to application in an upper or lower limb, and the length of a rehabilitation patient's upper or lower limb.

The distance adjustment part of the rehabilitation exercise unit 3 according to the present disclosure will be described with reference to FIGS. 5 to 8.

The rehabilitation exercise unit 3 according to the present disclosure, as an example, adopts a stacked slide-crank structure to the second support 320 so that the length of the second support 320 supporting the forearm or the calf is adjusted.

The second support 320 may include a first fixing plate 322, a second fixing plate 323, a first moving plate 324, a second moving plate 325, and a hinge shaft 321.

The first fixing plate 322 is connected to the pair of first hinges 311 and 312 to be rotatably coupled to the first support 310. The second fixing plate 323 is connected to the pair of second hinges 331 and 332 to be rotatably coupled to the third support 330.

The first moving plate 324 is provided between the first fixing plate 322 and the hinge shaft 321 and is movable reciprocally therebetween.

The second moving plate 325 is provided between the second fixing plate 323 and the hinge shaft 321 and is movable reciprocally therebetween.

The hinge shaft 321 is provided between the first fixing plate 322 and the second fixing plate 323.

Meanwhile, the distance adjustment part includes a first crank 326 and a second crank 327.

The first crank 326 is rotatably connected to the first fixing plate 322 and the hinge shaft 321 to convert a rotary motion of the hinge shaft 321 into a linear motion of the first fixing plate 322.

The first crank 326 includes a first adjustment link 326*a*, a second adjustment link 326*b*, and a first connection link 326*c*.

The first adjustment link 326*a* is rotatably coupled to the hinge shaft 321.

The second adjustment link 326*b* has a first side rotatably coupled to the first adjustment link 326*a*, and a second side rotatably coupled to the first fixing plate 322.

The first connection link 326*c* is rotatably coupled to the first moving plate 324 and an intermediate region of the first adjustment link 326*a*.

The second crank 327 is rotatably connected to the second fixing plate 323 and the hinge shaft 321 to convert a rotary motion of the hinge shaft 321 into a linear motion of the second fixing plate 323.

The second crank 327 includes a third adjustment link 327*a*, a fourth adjustment link 327*b*, and a second connection link 327*c*.

The third adjustment link 327*a* is rotatably coupled to the hinge shaft 321. The third adjustment link 327*a* is disposed opposite to the first adjustment link 326*a* at an angle of 180 degrees.

The fourth adjustment link 327*b* has a first side rotatably coupled to the third adjustment link 327*a*, and a second side rotatably coupled to the second fixing plate 323. The fourth adjustment link 327*b* is disposed opposite to the second adjustment link 326*b*.

The second connection link 327*c* is rotatably coupled to the second moving plate 325 and an intermediate region of the third adjustment link 327*a*. The second connection link 327*c* is disposed opposite to the first connection link 326*c*.

Meanwhile, reciprocating movement of the first moving plate 324 is guided by a pair of first guide rods 329*a* extending in length from the first fixing plate 322 toward the first moving plate 324. In addition, reciprocating movement of the first moving plate 324 is guided by a pair of third guide rods 329*c* extending in length from the hinge shaft 321 toward the first moving plate 324. Here, in this embodiment, it is illustrated that the first guide rods 329*a* and the third guide rods 329*c* are provided in pairs, respectively, but the present disclosure is not limited thereto. For example, at least one first guide rod 329*a* and at least one third guide rod 329*c* may be provided.

In addition, reciprocating movement of the second moving plate 325 is guided by a pair of second guide rods 329*b* extending in length from the second fixing plate 323 toward the second moving plate 325. In addition, reciprocating movement of the second moving plate 325 is guided by a pair of third guide rods 329*c* extending in length from the hinge shaft 321 toward the second moving plate 325. Here, in this embodiment, it is illustrated that the second guide rods 329*b* and the third guide rods 329*c* are provided in pairs, respectively, but the present disclosure is not limited thereto. For example, at least one second guide rod 329*b* and at least one third guide rod 329*c* may be provided.

According to the configuration as described above, in the distance adjustment part of the rehabilitation exercise device 1 according to the present disclosure, as illustrated in FIG. 7, by implementing the slide-crank mechanism in which the first fixing plate 322 and the first moving plate 324, and the second fixing plate 323 and the second moving plate 325 are operated in conjunction with each other, respectively, so as to be mutually approached or spaced apart with respect to the hinge shaft 321, it is possible to adjust the length of the second support 320, thereby adjusting the distance between the first support 310 and the third support 330.

Hereinafter, in order to help the understanding of the present disclosure, the adjustment of the length of the second support 320 will be described in detail with reference to FIG. 7.

In FIG. 7, when the first adjustment link 326*a* and the second adjustment link 326*b* are pivoted clockwise around the hinge shaft 321, the angle between the first adjustment link 326*a* and the second adjustment link 326*b* and the angle between the first adjustment link 326*a* and the first connection link 326*c* increase, so that the distance between the hinge shaft 321 and the first fixing plate 322 is increased. Similarly, the angle between the third adjustment link 327*a* and the fourth adjustment link 327*b*, and the angle between the third adjustment link 327*a* and the second connection link 327*c* increase to the same angle as that between the first adjustment link 326*a* and the second adjustment link 326*b*, so that the distance between the hinge shaft 321 and the second fixing plate 323 is increased. Consequently, the first fixing plate 322 and the second fixing plate 323 are spaced apart from each other by equal distances from the hinge shaft 321.

On the contrary, in FIG. 7, when the first adjustment link 326*a* and the second adjustment link 326*b* are pivoted counterclockwise around the hinge shaft 321, the angle between the first adjustment link 326*a* and the second adjustment link 326*b* and the angle between the first adjustment link 326*a* and the first connection link 326*c* decrease, so that the distance between the hinge shaft 321 and the first fixing plate 322 is decreased. Similarly, the angle between the third adjustment link 327*a* and the fourth adjustment link 327*b*, and the angle between the third adjustment link 327*a* and the second connection link 327*c* decreased to the same angle as that between the first adjustment link 326*a* and the second adjustment link 326*b*, so that the distance between the hinge shaft 321 and the second fixing plate 323 is decreased. Consequently, the first fixing plate 322 and the second fixing plate 323 are approached to each other by equal distances from the hinge shaft 321.

Therefore, in the rehabilitation exercise device 1 according to the present disclosure, the first fixing plate 322 and the first moving plate 324, and the second fixing plate 323 and the second moving plate 325 are operated in conjunction with each other, respectively, so as to be mutually approached or spaced apart with respect to the hinge shaft 321.

Meanwhile, the first fixing plate 322 and the second fixing plate 323 are connected to each other by a pair of connection bars 328.

In the present disclosure, a side of each of the connection bars 328 is fixed to the second fixing plate 323, and the first fixing plate 322 is movably coupled to the connection bars 328, so that the first fixing plate 322 is approached to and spaced apart from the second fixing plate 323.

A through-hole 322*a* (see FIG. 8) for allowing passage of each of the connection bars 328 therethrough may be formed in the first fixing plate 322, so that longitudinal movement of the first fixing plate 322 may be guided along the connection bar 238.

In addition, a length stopper 340 may be installed on the first fixing plate 322 to restrain the longitudinal movement of the first fixing plate 322, for example, to limit relative movement of the first fixing plate 322 and the second fixing plate 323. In the present disclosure, as an example, a pair of length stoppers 340 are installed on the pair of connection bars 328, respectively.

FIG. 8 is a sectional view illustrating the region of the length stopper 340 according to the present disclosure. Referring to FIG. 8, the length stopper 340 may include a restraining lever 341 and a pressurizing member 345.

The restraining lever 341 is rotatably installed on a rotary shaft 322*b* coupled to the first fixing plate 322.

The restraining lever 341 includes a pusher 342 provided at a first end thereof to pressurize or release the pressurizing member 345, and a knob 343 provided at a second end thereof to rotate the pusher 342 to allow the pusher 342 to pressurize or release the pressurizing member 345.

The pusher 342 has a semicircular arc shape having a predetermined radius of curvature, and is configured to be brought into contact with and spaced apart from the pressurizing member 345 by rotation.

Therefore, in FIG. 8, when the restraining lever 341 is rotated clockwise around the rotary shaft 322*b*, the pusher 342 is rotated toward the pressurizing member 345 to be brought into contact with the pressurizing member 345 and to pressurize the pressurizing member 345, and the pressurizing member 345 pressurizes the connection bar 328 passing through the through-hole 322*a* to prevent the first fixing plate 322 from moving in the longitudinal direction. On the other hand, when the restraining lever 341 is rotated counterclockwise around the rotary shaft 322*b*, the pusher 342 is spaced from the pressurizing member 345 and releases the pressurizing member 345, so that the connection bar 238 is allowed to be moved inside the through-hole 322*a*, thereby allowing the movement of the first fixing plate 322 in the longitudinal direction along the connection bar 328.

Here, in this embodiment, it is illustrated that a side of the connection bar 328 is fixed to the second fixing plate 323, and the first fixing plate 322 is movably coupled to the connection bar 328, but the present disclosure is not limited thereto. For example, the side of the connection bar 328 may be fixed to the first fixing plate 322, and the second fixing plate 323 may be movably coupled to the connection bar 328. In this case, the restraining lever 341 is provided on the second fixing plate 323.

FIGS. 9 to 12 are views illustrating an example of a structure for restraining longitudinal movement of a second support 320 according to another embodiment of the present disclosure. A rehabilitation exercise unit 3 according to the other embodiment of the present disclosure may include a rotation stopper 350 provided on a hinge shaft 321 to limit relative movement of a first fixing plate 322 and a second fixing plate 323.

As described above, the second support 320 according to the present disclosure has a slide-crank structure in adjusting a longitudinal length thereof, which includes rotation of the hinge shaft 321. The rotation stopper 350 restrains the rotation of the hinge shaft 321 to maintain a predetermined length.

The rotation stopper 350 includes a restraining dial 351, a shaft body 353 for forming the hinge shaft 321, a shaft column 354 protruding upward from the shaft body 353, and a shaft plate 352 rotated around the shaft body 354 and connected to the first adjustment link 326*a* and the third adjustment link 327*a* to rotate the first adjustment link 326*a* and the third adjustment link 327*a* with respect to the shaft body 353.

The restraining dial 351 includes a restraining pin 351*a* and a catching recess 351*c*.

The restraining pin 351*c* is formed by protruding from an end of the restraining dial 351 oriented toward the shaft body 353, and is inserted into or released from any one selected from among a plurality of restraining holes 352*a* which will be described later.

The catching recess 351*c* is depressed in a region of the end of the restraining dial 351 oriented toward the shaft body 353, at a position spaced from the restraining pin 351*a*. In this embodiment, a pair of catching recesses 351*c* are provided opposite to each other.

The plurality of restraining holes 352*a* are formed in the shaft body 353 at a predetermined interval along the circumferential direction of the shaft column 354.

The shaft plate 352 has a circular ring shape. The shaft plate 352 is configured such that the first adjustment link 326*a* and the third adjustment link 327*a* are connected to an outer circumference thereof, and the restraining dial 351 is rotatably provided on an inner circumference thereof. In addition, the shaft plate 352 has a pair of catching protrusions 352*b* protruding from a region of the inner circumference thereof, and connecting the restraining dial 351 to the shaft plate 352 by being caught by the catching recesses 351*c* of the restraining dial 351.

In addition, the rotation stopper 350 according to the present disclosure may further include an elastic member 355.

The elastic member 355 is provided between the shaft column 354 and the restraining dial 351, and generates elastic force acting on the restraining dial 351 so that the restraining pin 351*a* is inserted into the selected restraining hole 352*a*.

When a user wants to adjust the length of the second support 320, the user adjusts the length by pulling the restraining dial 351 upward so that the restraining dial 351 ascends from the shaft body 353 to a position where the restraining pin 351*a* is separated from the restraining hole 352*a*. Then, when the second support 320 is adjusted to a desired length, the user releases the restraining dial 351 so that the restraining dial 351 descends toward the shaft body 353 by the elastic force of the elastic member 355, and at the same time, the restraining pin 351*a* is inserted into the restraining hole 352*a* at a corresponding position.

With this configuration, in the rotation stopper 350 according to the present disclosure, when the restraining pin 351*a* is inserted into the restraining hole 352*a*, the shaft plate 352 is not rotated with respect to the shaft body 353, so that the length of the second support 320 is not allowed to be adjusted. At the same time, the catching protrusions 352*b* of the shaft plate 352 are caught by the catching recesses 351*c* of the restraining dial 351, so that the restraining dial 351 is prevented from being rotated around the shaft column 354.

On the other hand, in the rotation stopper 350 according to the present disclosure, when the dial pin 351*a* is released from the restraining hole 352*a*, the shaft plate 352 is rotated with respect to the shaft body 353, so that the length of the second support 320 is allowed to be adjusted. At this time, the catching protrusions 352*b* of the shaft plate 352 are maintained caught by the catching recesses 351*c* of the restraining dial 351, so that the restraining dial 351 is maintained in a state connected to the shaft plate 352. Thus, the restraining dial 351 is allowed to be rotatable forward and backward around the shaft column 354, so that the first fixing plate 322 and the second fixing plate 323 are mutually approached or spaced apart with respect to the shaft body 353, thereby adjusting the length of the second support 320.

In FIG. 11, reference numeral 351*b* denotes a pin insertion portion into which the restraining pin 351*a* is inserted and fixed, and reference numeral 351*d* denotes a shaft through-hole through which the shaft column 354 passes and fixed. For convenience of explanation, FIG. 10 illustrates a state in which the restraining pin 351*a* is inserted in the restraining hole 352*a* in a state of being released from the restraining dial 351.

As such, by implementing a slide-crank mechanism in which the first fixing plate 322 and a first moving plate 324, and the second fixing plate 323 and a second moving plate 325 are operated in conjunction with each other, respectively, so as to be mutually approached or spaced apart with respect to the hinge shaft 321, it is possible to adjust the length of the second support 320, thereby adjusting the distance between the first support 310 and the third support 330 in response to various lengths of the forearm or calf of the user during rehabilitation.

Hereinafter, the configuration of the holder 5 according to the present disclosure will be described in detail with reference to FIGS. 13 to 20.

As described above, the holder 5 may include the base plate 510, the mounting plate 520, and the link member 530. According to this configuration, a link mechanism as illustrated in FIG. 14 is implemented.

As described above, the opposite sides of the link member 530 are rotatably coupled to the base plate 510 and the mounting plate 520, respectively. Here, the first side (i.e., in the direction of the first support 510) of the mounting plate 520 is coupled to the base plate 510 to be horizontally movable along the plate surface thereof, and the first side of the link member 530 is rotatably coupled to the intermediate region of the mounting plate 520. In addition, a second side of the mounting plate 520 is approached to and spaced apart from the base plate 510 in the vertical direction by the link mechanism, so that angle adjustment is implemented as illustrated in FIGS. 1 and 2.

The second side of the link member 530 is rotatably coupled to a fixing shaft 531 provided on the base plate 510, so that when the first side of the mounting plate 520 moves in the horizontal direction, the angle of the mounting plate 520 is adjusted by rotation of the opposite sides of the link member 530.

Meanwhile, a pair of extension brackets 521 are installed opposite at the first side of the mounting plate 520 by extending parallel toward the third support 330. First ends of the pair of extension brackets 521, for example, first ends thereof oriented toward the first support 310, are rotatably coupled to the mounting plate 520. Second ends of the pair of extension brackets 521, for example, second ends thereof oriented toward the third support 330, are connected to each other by a connection rod 522.

In addition, a catching plate 511 is installed inside the base plate 510, with a plurality of catching protrusions 512 formed thereon along the longitudinal direction and allowing the connection rod 522 to be caught thereby in response to the angle between the mounting plate 520 and the base plate 510. The plurality of catching protrusions 512 are formed at a predetermined interval along the longitudinal direction of the pair of extension brackets 521, so that the connection rod 522 is selectively caught by the catching protrusions 512. Thus, in response to an inclination angle between the mounting plate 520 and the base plate 510, the connection rod 522 is caught by any one of the catching protrusions 512, so that the inclination angle is maintained at a predetermined angle.

In addition, the holder 5 according to the present disclosure may include a fixing unit 540 for fixing the connection rod 522 to maintain the connection rod 522 caught by any one of the catching protrusions 512.

In the embodiment of the present disclosure, as an example, as illustrated in FIGS. 15 and 16, the base plate 510 includes a plurality of restraining recesses 513*a* and a moving hole 513*b*.

The plurality of restraining recesses 513*a* are depressed in a side surface of the base plate 510 at respective positions corresponding to the catching protrusions 512. In other words, the plurality of restraining recesses 513*a* are arranged at a predetermined interval on the side surface of the base plate 510 along the longitudinal direction thereof in correspondence with the catching protrusions 512 arranged along the longitudinal direction of the extension brackets 521.

The moving hole 513*b* is formed in each of the restraining recesses 513*a* by passing therethrough to be oriented toward a selected catching protrusion 512. In other words, the moving hole 513*b* is formed to pass through an inside and an outside of a plate surface of the base plate 510 at a position where the restraining recess 513*a* is formed.

Here, as illustrated in in FIG. 16, the moving hole 513*b* has a shape that is open diagonally upward to allow insertion or release of an extension unit 542 of a fixing unit 540, which will be described later, into or from the moving hole 513*b*.

As illustrated in FIG. 17, the fixing unit 540 according to an embodiment of the present disclosure may include the extension unit 542 and a unit body 541.

The extension unit 542 has a first side connected to the connection rod 522, and a second side extending outward of the base plate 510 through the moving hole 513*b*. In the present disclosure, as an example, as illustrated in FIG. 20, the first side of the extension unit 542 is connected to the connection rod 522 through an intermediate plate 543. The intermediate plate 543 may be directly fastened to the connection rod 522 or may be connected to the connection rod 522 by being fastened to an associated one of the extension brackets 521 connected to the connection rod 522.

The unit body 541 is coupled to the second side of the extension unit 542. In the present disclosure, as an example, an insertion hole (not illustrated) for allowing insertion of the extension unit 542 therein is formed in the unit body 541 so that the extension unit 542 is inserted into the insertion hole to be coupled to the unit body 541.

In the embodiment of the present disclosure, as an example, the unit body 541 is coupled to the extension unit 542 so as to be movable between a fixing position inserted into the restraining recess 513*a* and a release position released from the restraining recess 513*a*. To this end, as an example, as illustrated in FIG. 17, the extension unit 542 has a pair of operating grooves 542*b* formed at a predetermined interval along the longitudinal direction thereof. In addition, as an example, the unit body 541 has an operating protrusion 541*c* caught by the operating grooves 542*b* at the fixing position and the release position of the unit body 541, respectively.

In the present disclosure, the operating protrusion 541*c* may be configured in a form that is elastically pressurized in the directions of the operating grooves 542*b* so that when the user pulls the unit body 541 in the release direction, the operating protrusion 541*c* caught by an inner operating groove 542*b* is released therefrom and inserted into an outer operating groove 542*b*. On the other hand, when the user pushes the unit body 541 in the fixing direction, the operating protrusion 541*c* caught by the outer operating groove 542*b* is released therefrom and inserted into the inner operating groove 542*b*.

In addition, the unit body 541 includes an insertion portion 541*b* inserted into the restraining recess 513*a* at the fixing position and the release position, and a knob 541*a* operable by the user to move the unit body 541 between the fixing position and the release position. Here, the insertion portion 541*b* is configured in a size that is insertable into the restraining recess 513*a*, preferably in a size that is caught by the moving hole 513*b* without moving thereinto.

According to the configuration as described above, when the user wants to adjust the angle between the base plate 510 and the mounting plate 520, the user pulls the knob 541*a* with the unit body 541 being at the fixing position to allow the unit body 541 to be moved to the release position, so that the insertion portion 541*b* of the unit body 541 is released from the restraining recess 513*a*.

In this state, when the user moves the knob 541*a* diagonally upward, the connection rod 522 connected to the extension unit 542 is released from the catching protrusion 512, and at the same time, the extension unit 542 is moved along the moving hole 513*b* to a position outside the moving hole 513*b*.

In this state, when the user moves the knob 541*a* while adjusting the angle of the mounting plate 520 so that the extension unit 542 is inserted into a moving hole 513*b* associated with a desired angle, the extension unit 542 is inserted into the moving hole 513*b*, and at the same time, the connection rod 522 is caught by an associated one of the catching protrusions 512.

When the angle adjustment is completed as described above, the user pushes back the unit body 541 to allow the insertion portion 541*b* to be inserted into a restraining recess 513*a* associated with the moving hole 513*b*. Then, the insertion portion 541*b* is caught by the moving hole 513*b*, so that the connection rod 522 is fixed to the selected catching protrusion 512.

Meanwhile, as illustrated in FIG. 18, each of the catching protrusions 512 according to an embodiment of the present disclosure may extend to a length corresponding to the length of the connection rod 522 in a direction intersecting the longitudinal direction of the extension brackets 521, i.e., in the longitudinal direction of the connection rod 522.

In addition, as illustrated in FIGS. 18 and 19, each of the catching protrusions 512 according to the embodiment of the present disclosure may be configured such that a side thereof in a direction in which the fixing unit 540 is installed, i.e., a D1 direction in FIG. 19, protrudes relatively more than an opposite side thereof in a D2 direction, in a direction in which catching is released.

As described above, in the embodiment of the present disclosure, as an example, the fixing unit 540 is installed only on a side of the base plate 510. Thus, when the user releases the connection rod 522 from the catching protrusion 512 while moving the fixing unit 540, a lengthwise side of the connection rod 522 in the direction of the fixing unit 540 may be lifted relatively more in the release direction, and an opposite lengthwise side may be lifted relatively less.

Therefore, as illustrated in FIG. 19, by configuring a lengthwise side of the catching protrusion 512 opposite to the direction of the fixing unit 540 to protrude relatively less, in releasing the connection rod 522 from the catching protrusion 512 through manipulation of the fixing unit 540, when catching of the lengthwise side of the connection rod in the direction in which the fixing unit 540 is installed is released, the entire connection rod 522 may be released from the catching protrusion 512.

Meanwhile, as illustrated in FIG. 20, the rehabilitation exercise device 1 for the upper and lower limbs according to the embodiment of the present disclosure may further include an elastic unit 522*f*.

The elastic unit 522*f* provides an elastic force acting in a direction in which the connection rod 522 is maintained caught by the catching protrusion 512, so that the connection rod 522 is prevented from being released from the catching protrusion 512 without a user's manipulation. For example, in a state in which the unit body 541 of the fixing unit 540 is located at the release position due to a process of a user's manipulation or other cause, when the connection rod 522 is released from the catching protrusion 512 due to an external impact or the like, the mounting plate 520 may be rapidly folded in the direction of the base plate 510. Therefore, the release of the connection rod 522 is prevented even with a certain impact, so that a safety accident is prevented from occurring.

In addition, even during the manipulation of the fixing unit 540, the connection rod 522 is in a state of being pressurized in the insertion direction into the catching protrusion 512. Therefore, a force that moves the connection rod 522 in the insertion direction is generated at an insertion position of the connection rod 522, thereby facilitating the insertion of the connection rod 522 into the catching protrusion 512.

This will be described in more detail with reference to FIG. 20. The mounting plate 520 according to an embodiment of the present disclosure may include a moving bracket 526, a pair of mounting brackets 525, and a mounting portion 527 (referring to FIGS. 13 and 18).

The moving bracket 526 is installed on the base plate 510 to be horizontally movable along the base plate 510. The pair of mounting brackets 525 are rotatably coupled to opposite sides of the moving bracket 526. Here, each of the pair of link members 530 may be rotatably coupled to an intermediate region of an associated one of the mounting brackets 525. The mounting portion 527 is formed in a plate shape supported by the moving bracket 526 and the mounting brackets 525 to define an upper plate of the mounting plate 520, and allows mounting of the rehabilitation exercise unit 2 thereon.

Here, the extension brackets 521 are rotatably coupled to the opposite sides of the moving brackets 526 so that the moving bracket 526 is moved in conjunction with movement of the extension brackets 521. At this time, the elastic unit 522*f* pressurize at least one of the pair of extension brackets 521 downward in a state of being installed on the moving bracket 526, so that the connection rod 522 coupled to the extension brackets 521 is pressurized in a direction caught by the catching protrusion 512.

In the present disclosure, as an example, as illustrated in FIG. 20, the elastic unit **522*f* is provided in the form of a plate spring. In addition, the extension bracket 521 has a skirt 522*d* extending inward, so that the elastic unit 522*f* pressurizes the skirt 522*d* to pressurize the extension bracket 521**.

Meanwhile, in the rehabilitation exercise device 1 according to the present disclosure, the drive module 7 may be selectively couple to any one of the pair of first hinges 311 and 312 and the pair of second hinges 331 and 332. For example, in the case of the upper limb, when the drive module 7 is mounted on any one of the first hinges 311 and 312, wrist rehabilitation exercise is possible. On the other hand, when the drive module 7 is mounted on any one of the second hinges 331 and 332, elbow joint rehabilitation exercise is possible.

At this time, in the case of the pair of first hinges 311 and 312, a mounting position of the drive module 7 may be determined according to rehabilitation of a left or right upper limb. Similarly, in the case of the pair of second hinges 331 and 332, the drive module 7 may be selectively mounted according to rehabilitation of a right or left upper limb.

Hereinafter, the drive module 7 according to the present disclosure will be described in detail with reference to FIGS. 21 to 24.

As described above, the drive module 7 is selectively mounted on any one of the pair of first hinges 311 and 312 and the pair of second hinges 331 and 332 to pivot the first support 310 or the second support 320.

The drive module 7 may include a body housing 710 in which components such as a drive motor, a printed circuit board, etc. are accommodated, a drive shaft 720 to which a rotary shaft of the drive motor is connected, and a ring member 730 for allowing mounting and fixing of the drive module 7 on the first hinges 311 and 312 or the second hinges 331 and 332.

In addition, a ring coupling portion 751 is formed on each of the first hinges 311 and 312 or each of the second hinges 331 and 332.

Meanwhile, in this embodiment, the drive module 7 is mounted on the second hinge 332 located on the right side as viewed from the first support 310 to the third support 330 in FIG. 1. Therefore, for convenience of explanation, the second hinge 332 located on the right side is hereinafter referred to as a right second hinge 332.

Here, a plurality of mounting protrusions 731 are formed on an inside of the ring member 730 at a predetermined interval along the circumferential direction of the ring member 730, and a ring coupling portion 751 to which the ring member 730 of the drive module 7 is coupled is provided circumferentially around an opening of the right second hinge 332. A plurality of catching portions 753 may be formed in the ring coupling portion 751 corresponding to the mounting protrusions 731.

Thus, when the drive module 7 is inserted into the right second hinge 332 and then the ring member 730 is rotated, the mounting protrusions 731 are rotated and caught by the catching portions 753, so that the drive module 7 is prevented from being released.

In addition, a catching lever 740 is provided on the body housing **710*a* to restrain rotation of the ring member 730 by being inserted into the ring member 730, so that after rotating the ring member 730, the catching lever 740 is pushed and inserted into the ring member 730 to thereby prevent rotation of the ring member 730**.

Meanwhile, as illustrated in FIG. 24, the right second hinge 332 according to the embodiment of the present disclosure may have a rotary shaft hole **3322*a* for receiving the drive shaft of the drive module 7. Here, the drive shaft 720 of the drive module 7 passes through the rotary shaft hole 3322*a* and is coupled to the right second hinge 332 when the drive module 7 is mounted on the right second hinge 332. Thus, when the drive shaft 720 is rotated in response to the driving of the drive module 7, the second support 320** is pivoted.

In more detail, in the embodiment of the present disclosure, as an example, as illustrated in FIG. 21, the second support 320 includes a shaft coupling bracket 3231 and a drive shaft fixing member 360.

The shaft coupling bracket 3231 may extend toward the drive shaft of the drive module 7. In the embodiment of the present disclosure, as an example, as illustrated in FIG. 21, the shaft coupling bracket 3231 extends from the second fixing plate 323 of the second support 320 toward the rotary shaft of the drive motor.

The drive shaft fixing member 360 fixes the drive shaft 720 inserted through the rotary shaft hole **3322*a* to the shaft coupling bracket 3231 when the drive module 7 is fastened to the right second hinge 332. Thus, when the drive shaft 720 is rotated in response to the driving of the drive module 7, the shaft coupling bracket 3231 is pivoted in response to the rotation of the drive shaft 720, so that the entire second support 320 is pivoted with respect to the third support 330**.

In the present disclosure, for example, the drive shaft 720 has a polygonal shape in cross-section. Although FIGS. 21 and 23 illustrate that the drive shaft 720 has a hexagonal shape in cross-section, the scope of the present disclosure is not limited thereto.

Corresponding to the cross-sectional shape of the drive shaft 720, as illustrated in FIG. 22, the drive shaft fixing member 360 according to the embodiment of the present disclosure may include a polygonal fixing hole 364 having a polygonal inner diameter. As described above, the polygonal fixing hole 364 may also be configured to have a hexagonal inner diameter corresponding to the drive shaft 720 having a hexagonal shape in cross-section.

This will be described in more detail with reference to FIG. 22. The drive shaft fixing member 360 may include a bracket fastening portion 361 and a pair of tightening members 362 and 363.

The bracket fastening portion 361 is provided at a first side of the drive shaft fixing member 360 with respect to the polygonal fixing hole 364, and is fastened to the shaft coupling bracket 3231 to fix the drive shaft fixing member 360 to the shaft coupling bracket 3231.

The pair of tightening members 362 and 363 are provided at a second side of the drive shaft fixing member 360 with respect to the polygonal fixing hole 364, and are spaced apart from each other with a space 365 formed therebetween. As illustrated in FIG. 22, the fixing hole 364 is formed between the pair of tightening members 362 and 363. In a state in which the drive shaft 720 is inserted into the polygonal fixing hole 364, the pair of tightening members 362 and 363 are approached to each other, so that the drive shaft 720 inserted into the polygonal fixing hole 364 is tightened and fixed.

In the embodiment illustrated in FIG. 22, as an example, the pair of tightening members 362 and 363 are branched from the bracket fastening portion 361, but the present disclosure is not limited thereto. For example, the pair of tightening members 362 and 363 may be configured such that two symmetrical members are combined at respective first sides thereof to form the bracket fastening portion 361, with respective second sides thereof spaced apart from each other.

In the embodiment of the present disclosure, as an example, the bracket fastening portion 361 is fastened to the shaft coupling bracket 3231 through bolt fastening. To this end, a plurality of bolt fastening holes 366*c* are formed in the bracket fastening portion 361, and in the present disclosure, as an example, the bolt fastening is performed in the biaxial direction. In other words, as an example, the plurality of bolt fastening holes 366*c* include a pair of bolt fastening holes 366*c* fastened to coupling holes 3231*a* formed in a plate surface of the shaft coupling bracket 3231, and a pair of bolt fastening holes 366*b* fastened to coupling holes 3234*a* formed in a pair of extension portions 3234 extending in a U-shape from the plate surface of the shaft coupling bracket 3231.

In addition, any one of the pair of tightening members 362 and 363 may have a first tightening hole 366*a* passing through a side thereof, and a remaining one of the pair of tightening members 362 and 363 may have a second tightening hole (not illustrated) for fastening a tightening bolt (not illustrated) passing through the first tightening hole so as to adjust the distance between the tightening members 362 and 363.

Meanwhile, the right second hinge 332 may include a first rotary part 3322 and a second rotary part 3321.

The first rotary part 3322 is rotated in conjunction with the right second support 320 in response to rotation of the drive shaft 720. In addition, the second rotary part 3321 is installed to be freely rotatable with respect to the first rotary part 3322, and is connected to the third support 330 to be rotated in conjunction with the third support 330. Here, as an example, the first rotary part 3322 and the second rotary part 3321 are coaxially coupled around the rotary shaft hole 3322*a*.

In the embodiment of the present disclosure, as an example, the first rotary part 3322 is axially coupled to the shaft coupling bracket 3231 to be rotated relative to the second rotary part 3321 in conjunction with rotation of the drive shaft 720.

FIG. 23 is a view illustrating a state in which the drive shaft fixing member 360 is removed, and FIG. 24 is a view illustrating a state in which the shaft coupling bracket 3231 is removed.

Referring to FIGS. 23 and 24, the shaft coupling bracket 3231 may further include a bracket coupling hole 3232 and a plurality of rotation synchronization holes 3233.

The bracket coupling hole 3322 is formed corresponding to the rotary shaft hole 3322*a*, and allows passage of the drive shaft 720 passing through the rotary shaft hole 3322*a*. The drive shaft 720 passing through the bracket coupling hole 3232 is fixed by the drive shaft fixing member 360.

The rotation synchronization holes 3233 are formed by passing through the plate surface of the shaft coupling bracket 3231 along the outer periphery of the bracket coupling hole 3232. Here, as illustrated in FIG. 24, the first rotary part 3322 may include a plurality of rotation synchronization protrusions 3322*b*. Thus, when the shaft coupling bracket 3231 is fastened to the first rotary part 3322, the rotation synchronization protrusions 3322*b* are inserted into the respective rotation synchronization holes 3233, so that when the drive shaft 720 is rotated in response to the driving of the drive module 7, the first rotary part 3322 is rotatable in conjunction with rotation of the shaft coupling bracket 3231.

The configuration of the right second hinge 332 driven by being coupled to the drive module 7 described with reference to FIGS. 21 to 24 is symmetrically implemented in the remaining second hinge 331. Similarly, the same mechanism may be applied to each of the first hinges 311 and 312, except that the first support 310 and the second support 320 are configured such that the first support 310 is pivoted in response to the driving of the drive module 7.

Hereinafter, a rotation restraining part 770 according to an embodiment of the present disclosure will be described in detail with reference to FIGS. 25 to 28.

As illustrated in FIGS. 1, 2, and 25, a hinge cover 780 may be installed where the drive module 7 is not installed from among the pair of first hinges 311 and 312 and the pair of second hinges 331 and 332. FIGS. 25 to 28 illustrate the first hinge 312 on the right side from among the first hinges 311 and 312.

The rotation restraining part 770 includes a rotary gear plate 776 rotated in conjunction with the first rotary part 3322, i.e., the first rotary part 3322 rotated in conjunction with the first support 310 or the second support 320, and a gear restraining member 771 installed on the second rotary part 3321.

The rotary gear plate 776 may have gear teeth circumferentially formed along an end thereof, and the gear restraining member 771 may have a gear insertion portion 772 formed at an end thereof to be insertable into a space between the gear teeth. Thus, when the gear insertion portion 772 is inserted into the space between the gear teeth of the rotary gear plate 776 by sliding the gear restraining member 771, rotation of the first rotary part 3322 is restrained.

Here, the rotation restraining part 770 may include a pair of restraining protrusions 774 protruding opposite to each other and being able to be elastically pressurized. In addition, a pair of restraining recesses 775 may be formed in a plate surface of the second rotary part 3321 at each side of the rotation restraining part 770 along the moving direction of the rotation restraining part 770 so that when the rotation restraining part 770 is moved in the vertical direction, the restraining protrusions 774 are inserted into the restraining recesses 775.

With this configuration, as illustrated in FIG. 1, When the drive module 7 is mounted on the second hinges 331 and 332, and the gear restraining member 771 and the rotary gear plate 776 of each of the pair of first hinges 311 and 312 are meshed with each other so that the pair of first hinges 311 and 312 are not rotated, the second support 320 performs a pivoting motion by a rotational force of the drive module 7, whereas the first support 310 is limited in pivoting motion, so that the user can exercise an elbow joint while a wrist joint is not moved.

In addition, when the drive module 7 is mounted on the first hinges 311 and 312, and the gear restraining member 771 and the rotary gear plate 776 of each the pair of second hinges 331 and 332 are meshed with each other so that the pair of second hinges 331 and 332 are not rotated, the first support 310 performs a pivoting motion by the rotational force of the drive module 7, whereas the second support 320 is limited in pivoting motion, so that the user can exercise the wrist joint while the elbow joint is not moved.

The above configuration may be applied equally to the second hinges 331 and 332.

FIG. 26 is a view illustrating the configuration of a rotation restraining part 770 according to another embodiment of the present disclosure.

In the embodiment illustrated in FIG. 27, a pair of restraining recesses 774*a* are formed on each side of the rotation restraining part 770, and a restraining rod 775*a* installed in the second rotary part 3321 is inserted into the restraining recesses 774*a*. Here, the restraining rod 775*a* is elastically pressurized in a direction of being inserted into the restraining recesses 774*a*, and, for example, may have a configuration that is pressurized in the direction of being inserted into the restraining recesses 774*a* by an elastic force of a spring.

Meanwhile, as illustrated in FIGS. 21 and 23, the drive module 7 according to the embodiment of the present disclosure may include a gear protrusion.

Here, the gear protrusion is installed on a position capable of being in contact with the gear restraining member 771 at a position where the gear restraining member 771 is meshed with the rotary gear plate 776. Thus, the drive module 7 is prevented from being fastened to the first hinges 311 and 312 or the second hinges 331 or 332 in a state in which the gear restraining member 771 is meshed with the rotary gear plate 776, i.e., in a state in which the first rotary part 3322 and the second rotary part 3321 cannot be rotated relative to each other. In other words, this is because when fastening of the drive module 7 is allowed in a state in which the gear restraining member 771 is meshed with the rotary gear plate 776, the drive module 7 is rotated in a state in which rotation of the first rotary part 3322 is restrained, which may cause failure of the drive module 7.

Therefore, by not allowing fastening of the drive module 7 in a state in which rotation of the first rotary part 3322 is restrained, failure due to the above-described situation is prevented from occurring.

In addition, each of the first hinges 311 and 312 and the second hinges 331 and 332 may have a status display window 773 on which a current status is displayed in response to the operation of the gear restraining member 771. In other words, when the gear restraining member 771 is at a position meshed with the rotary gear plate 776, 'Lock' may be displayed on the status display window 773. On the other hand, when the meshing is released, 'Unlock' may be displayed on the status display window 773. On the other hand, this may be mechanically implemented so that such characters are displayed in conjunction with sliding movement of the gear restraining member 771.

In the above embodiment, as an example, the gear restraining member 771 is installed on the second rotary part 3321 and the rotary gear plate 776 is configured to be rotated in conjunction with the first rotary part 3322. However, the opposite example may be applied. In other words, the gear restraining member 771 may be installed on the first rotary part 3322, and the rotary gear plate 776 may be configured to be rotated in conjunction with the second rotary part 3321.

Meanwhile, the rehabilitation exercise apparatus 1 according to an embodiment of the present disclosure may enable the user to perform rehabilitation by selectively mounting the drive module 7 to each hinge in response to a position of the upper or lower limb to be exercised.

For example, when the drive module 7 is mounted on the left first hinge 311 or the left second hinge 331, the rehabilitation exercise device 1 according to the embodiment of the present disclosure is worn on a right upper limb to exercise, without causing interference of the drive module 7 with a user's torso. In this case, when the drive module 7 is mounted on the left first hinge 311, exercise of a right wrist joint is possible. On the other hand, when the drive module 7 is mounted on the left second hinge 331, exercise of a right elbow joint is possible.

When the drive module 7 is mounted on the right first hinge 312 or the right second hinge 332, the rehabilitation exercise device 1 according to the embodiment of the present disclosure is worn on a left upper limb to exercise, without causing interference of the drive module 7 with the user's torso. In this case, when the drive module 7 is mounted on the right first hinge 312, exercise of a left wrist joint is possible. On the other hand, when the drive module 7 is mounted on the right second hinge 332, exercise of a left elbow joint is possible.

Here, the drive module 7 according to the embodiment of the present disclosure may be configured to enable interworking with an app installed in a smart device such as a smart phone. In this case, it will be preferable for the drive module 7 to be able to automatically recognize whether the drive module 7 is installed on the first hinges or the second hinges, and whether the drive module 7 is installed on the left or right side.

Thus, the rehabilitation exercise apparatus 1 according to the embodiment of the present disclosure may include a mounting position detecting part for automatically detecting the mounting position of the drive module 7.

The mounting position detecting part detects the mounting position where the drive module 7 is mounted from among the pair of first hinges 311 and 312 and the pair of second hinges 331 and 332. In the embodiment of the present disclosure, as an example, the mounting position detecting part includes a to-be-detected module, and a sensor module HS.

The to-be-detected module is installed on each of the pair of first hinges 311 and 312 and the pair of second hinges 331 and 332. In addition, the sensor module HS is installed in the drive module 7, and recognizes the to-be-detected module when the drive module 7 is mounted on any one of the first hinges 311 and 312 and the second hinges 331 and 332.

Here, the respective to-be-detected modules installed on the first hinges 311 and 312 and the second hinges 331 and 332 are configured to be distinguishably recognized, so that the sensor module HS recognizes where the drive module 7 is installed from among the first hinges 311 and 312 and the second hinges 331 and 332.

FIGS. 28 and 29 are views illustrating an example of the configuration of a mounting position detecting part according to an embodiment of the present disclosure. As an example, the sensor module HS according to the embodiment of the present disclosure includes a Hall sensor.

As an example, as illustrated in FIG. 21, the Hall sensor is installed in the body housing 710 of the drive module 7.

As an example, the respective to-be-detected modules include magnet members M and magnet holes 810*a*, 810*b*, 810*c*, and 810*d*. The respective magnet members M may be embedded in the first hinges 331 and the second hinges 331 and 332 at positions corresponding to each other. Here, the magnet members M are installed at positions detectable by the Hall sensor when the drive module 7 is mounted on the first hinges 311 and 312 or the second hinges 331 and 332.

As illustrated in FIG. 28, the magnet holes 810*a*, 810*b*, 810*c*, and 810*d* are formed in the first hinges 311 and 312 and the second hinges 331 and 332, respectively, to allow exposure of the magnet members M therethrough. Here, the respective magnet holes 810*a*, 810*b*, 810*c*, and 810*d* may be configured to differ in at least one of position and size, so that when detecting the magnetic fields of the magnet members M, the Hall sensor recognizes the mounting position of the drive module 7 by detecting magnetic fields having different characteristics according to the positions and sizes of the magnet holes 810*a*, 810*b*, 810*c*, and 810*d*.

Referring to FIG. 29, the four magnet holes 810*a*, 810*b*, 810*c*, and 810*d* formed in the first hinges 311 and 312 and the second hinges 331 and 332, respectively, may be located at upper and lower positions with respect to the Hall sensor. For example, when the magnet hole 810*a* is formed in the right first hinge 312, the magnet hole 810*b* is formed in the left first hinge 311, the magnet hole 810*c* is formed in the right second hinge 332, and the magnet hole 810*d* is formed in the left second hinge 331, during mounting of the drive module 7, the mounting position of the drive module 7 is recognized by detecting magnetic fields having different characteristics according to the positions of the magnet holes 810*a*, 810*b*, 810*c*, and 810*d*.

Although in FIG. 29 it is illustrated that the magnet holes 810*a*, 810*b*, 810*c*, and 810*d* have different positions and sizes, other configurations are possible as long as magnetic field characteristics are distinguishable.

In another embodiment, the to-be-detected module may include a short-range communication tag, for example, a RF or NFC tag, in which information on a corresponding position is embedded, and the sensor module HS may include a reader that recognizes the information embedded in the tag.

Meanwhile, FIGS. 30A to 33B are views illustrating a drive module 7 according to another embodiment of the present disclosure.

In this embodiment, the drive module 7 is mounted on the second hinge 332 located on the right side as viewed from the first support 310 to the third support 330 in FIG. 1. Therefore, for convenience of explanation, the second hinge 332 located on the right side is hereinafter referred to as a right second hinge 332.

The right second hinge 332 includes a hinge shaft 760*a* with which a drive shaft 720*a* of the drive module 7 is meshed.

As illustrated in FIGS. 33A and 33B, the drive shaft 720*a* and the hinge shaft 760*a* respectively include pluralities of jaws 720*b* and 760*b* that circumferentially alternately protrude to face each other.

The respective jaws 720*b* and 760*b* of the driving shaft 720*a* and the hinge shaft 760*a* are meshed with each other, so that a rotational force of the drive module 7 is transmitted to the right second hinge 322 through the hinge shaft 760*b*. Here, the hinge shaft 760*a* of the right second hinge 322 is connected to the second support 330.

In addition, any one of the drive shaft 720*a* and the hinge shaft 760*a* includes an elastic member 765*a*, such as a spring, for generating an elastic force acting on the remaining opposite one to be pressurized, so that the drive shaft 720*a* and the hinge shaft 760*a* are firmly connected to each other.

In addition, each of the jaws 720*b* and 760*b* of the drive shaft 720*a* and the hinge shaft 760*a* is configured such that opposite sides thereof are inclined, so that the drive shaft 720*a* and the hinge shaft 760*a* are easily coupled to each other even when slight misalignment occurs during initial coupling.

As such, the rehabilitation exercise device 1 according to the present disclosure allows the drive module 7 to be easily mounted on and removed from a desired hinge, thereby enabling the user to perform a rehabilitation exercise with improved convenience.

Although exemplary embodiments of the present disclosure have been described with reference to the accompanying drawings, those skilled in the art will appreciate that various modifications, additions and substitutions are possible, without departing from the scope and spirit of the disclosure as defined in the appended claims. Thus, the above-described exemplary embodiments are intended to be illustrative in all respects, rather than restrictive, of the present disclosure.

The present disclosure can find application in a rehabilitation exercise device for rehabilitation of a patient's upper or lower limb.

What is claimed is:

1. A rehabilitation exercise device for upper and lower limbs, the rehabilitation exercise device comprising:
- a first support configured to support a user's hand or foot;
- a second support configured to support a user's forearm or calf;
- a pair of first hinges rotatably connecting the first support and the second support to each other;
- a third support configured to support a user's upper arm or thigh;
- a pair of second hinges rotatably connecting the second support and the third support to each other; and
- a drive module selectively mounted on any one of the pair of first hinges and the pair of second hinges, and configured to pivot the first support or the second support, wherein the drive module comprises:
- a body housing in which a drive motor is accommodated;
- a drive shaft to which a rotary shaft of the drive motor is connected; and
- a ring member provided on an outer periphery of the body housing, wherein each of the first hinges or each of the second hinges comprises:
- a ring coupling portion to which the ring member is coupled; and
- a hinge shaft with which the drive shaft is meshed.

2. The rehabilitation exercise device of claim 1, wherein each of the first hinges or each of the second hinges comprises a rotary shaft hole configured to receive the drive shaft of the drive module; and
- the drive module comprises the drive shaft passing through the rotary shaft hole and coupled to the first support or the second support when the drive module is mounted on one of the first hinges or one of the second hinges, the drive shaft thus pivoting the first support or the second support.

3. The rehabilitation exercise device of claim 2, wherein the first support or the second support comprises:
- a shaft coupling bracket extending toward the rotary shaft of the drive motor; and
- a drive shaft fixing member fixing the drive shaft inserted through the rotary shaft hole to the shaft coupling bracket.

4. The rehabilitation exercise device of claim 3, wherein the drive shaft has a polygonal shape in cross-section; and
- the drive shaft fixing member comprises a polygonal fixing hole having a polygonal inner diameter corresponding to the cross-sectional shape of the drive shaft.

5. The rehabilitation exercise device of claim 4, wherein the drive shaft fixing member comprises:
- a bracket fastening portion provided at a first side thereof with respect to the polygonal fixing hole, and fastened to the shaft coupling bracket; and
- a pair of tightening members provided at a second side thereof with respect to the polygonal fixing hole at positions spaced apart from each other, wherein in a state in which the drive shaft is inserted into the polygonal fixing hole, the pair of tightening members are approached to each other, so that the drive shaft inserted into the polygonal fixing hole is tightened and fixed.

6. The rehabilitation exercise device of claim 5, wherein the bracket fastening portion is fastened to the shaft coupling bracket through bolt fastening.

7. The rehabilitation exercise device of claim 4, wherein any one of the pair of tightening members comprises a first tightening hole passing through a side thereof; and a remaining one of the pair of tightening members comprises a second tightening hole for fastening a tightening bolt passing through the first tightening hole so as to adjust a distance between the pair of tightening members.

8. The rehabilitation exercise device of claim 3, wherein each of the first hinges or each of the second hinges comprises:

a first rotary part configured to be rotated in conjunction with the first support or the second support in response to rotation of the drive shaft; and a second rotary part configured to be freely rotatable with respect to the first rotary part, wherein the first rotary part and the second rotary part are coaxially coupled around the rotary shaft hole; and the first rotary part is axially coupled to the shaft coupling bracket to be rotated relative to the second rotary part in conjunction with rotation of the drive shaft.

9. The rehabilitation exercise device of claim 3, wherein the shaft coupling bracket comprises:

a bracket coupling hole formed corresponding to the rotary shaft hole, and allowing passage of the drive shaft passing through the rotary shaft hole; and a plurality of rotation synchronization holes passing through a plate surface of the shaft coupling bracket along an outer periphery of the bracket coupling hole, wherein the first rotary part further comprises a rotation synchronization protrusion inserted into each of the rotation synchronization holes when the shaft coupling bracket is fastened to the first rotary part, and allowing the first rotary part to be rotatable in conjunction with rotation of the shaft coupling bracket.

10. The rehabilitation exercise device of claim 1, further comprising:

a mounting protrusion formed on the ring member; and a catching portion formed on the ring coupling portion, and configured such that when the ring member is rotated and coupled to the ring coupling portion, the mounting protrusion is rotated and fitted into the catching portion.

11. The rehabilitation exercise device of claim 1, further comprising:

a catching lever provided on the body housing, and configured to restrain rotation of the ring member by being inserted into the ring member.

12. The rehabilitation exercise device of claim 1, wherein the drive shaft and the hinge shaft respectively comprise pluralities of jaws that circumferentially alternately protrude and are meshed with each other.

13. The rehabilitation exercise device of claim 12, wherein each of the jaws is configured such that opposite sides thereof are inclined.

14. The rehabilitation exercise device of claim 1, further comprising:

an elastic member provided on any one of the drive shaft and the hinge shaft, and configured to generate an elastic force acting on a remaining one of the drive shaft and the hinge shaft so that the drive shaft and the hinge shaft are connected to each other.

* * * * *